US012277878B2

(12) United States Patent
Vadali et al.

(10) Patent No.: US 12,277,878 B2
(45) Date of Patent: *Apr. 15, 2025

(54) DISPLAYING DIRECTIONAL VISUAL INDICATORS FROM A WEARABLE DEVICE FOR NAVIGATION

(71) Applicant: QUALCOMM Incorporated, San Diego, CA (US)

(72) Inventors: Sai Krishna Vadali, Hyderabad (IN); Sudha Rani Vatte, Miryalaguda (IN); Hemang Jayant Shah, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,615

(22) Filed: Feb. 27, 2023

(65) Prior Publication Data

US 2023/0335025 A1 Oct. 19, 2023

Related U.S. Application Data

(63) Continuation of application No. 17/723,401, filed on Apr. 18, 2022, now Pat. No. 11,657,740.

(51) Int. Cl.
*G09G 3/00* (2006.01)
*G01C 21/36* (2006.01)
(Continued)

(52) U.S. Cl.
CPC ......... *G09G 3/002* (2013.01); *G01C 21/3632* (2013.01); *G04G 9/007* (2013.01); *G04G 21/04* (2013.01)

(58) Field of Classification Search
CPC ............. G09G 3/002; G09G 2340/145; G01C 21/3632; G01C 21/365; G01C 21/3661;
(Continued)

(56) References Cited

U.S. PATENT DOCUMENTS 5,416,478 A 5/1995 Morinaga
11,200,869 B1 12/2021 Post et al.
(Continued)

FOREIGN PATENT DOCUMENTS

CN 203422587 U 2/2014
CN 104535075 A 4/2015
(Continued)

OTHER PUBLICATIONS

International Search Report and Written Opinion—PCT/US2023/064062—ISA/EPO—Aug. 31, 2023 (2201129WO).
(Continued)

*Primary Examiner* — Premal R Patel
(74) *Attorney, Agent, or Firm* — Holland & Hart LLP/Qualcomm

(57) ABSTRACT

This disclosure provides systems, methods, and apparatus, including computer programs encoded on computer-readable media, for displaying directional visual indicators external to a wearable device for navigation. In some aspects, a wearable device may receive navigation signals while the wearable device is in a navigation mode. The navigation signals may indicate a direction of travel. The wearable device may display a first directional visual indicator corresponding to the direction of travel. The first directional visual indicator may be displayed external to the wearable device indicating the direction of travel is a first direction. The first directional visual indicator may be a directional light or a directional projection displayed external to the wearable device in the direction of travel. If the direction of travel changes from the first direction to a second direction, the wearable device may display a second directional visual indicator indicating the direction of travel is the second direction.

24 Claims, 12 Drawing Sheets

(51) Int. Cl.
*G04G 9/00* (2006.01)
*G04G 21/04* (2013.01)

(58) Field of Classification Search
CPC ........ G01C 21/20; G04G 9/007; G04G 21/04; G04G 21/00; G04G 9/0064; H05B 45/10; H05B 47/105; H05B 47/155; G06F 1/163; G06F 1/3212; H04N 9/3173; H04N 9/3194
See application file for complete search history.

(56) References Cited

U.S. PATENT DOCUMENTS

| | | | |
|---|---|---|---|
| 11,657,740 B1 | 5/2023 | Vadali | |
| 2010/0253595 A1* | 10/2010 | Szczerba | G02B 27/01 701/31.4 |
| 2015/0094951 A1* | 4/2015 | Gepner | G04G 21/02 701/487 |
| 2016/0127624 A1* | 5/2016 | Woo | G06F 3/011 348/36 |
| 2016/0335983 A1 | 11/2016 | Lee et al. | |
| 2017/0115633 A1* | 4/2017 | Poguntke | G01C 21/20 |
| 2017/0136297 A1* | 5/2017 | Penie | G09B 19/003 |
| 2018/0314212 A1* | 11/2018 | Lee | G06F 3/017 |
| 2018/0357887 A1* | 12/2018 | Geyer | G08B 21/0469 |
| 2020/0005791 A1* | 1/2020 | Rakshit | G10L 15/26 |
| 2021/0396538 A1* | 12/2021 | Cun | B62K 3/002 |

FOREIGN PATENT DOCUMENTS

| | | |
|---|---|---|
| CN | 105629515 A | 6/2016 |
| CN | 105661731 A | 6/2016 |
| CN | 109635710 A | 4/2019 |
| JP | H11325942 A | 11/1999 |

OTHER PUBLICATIONS

Partial International Search Report—PCT/US2023/064062—ISA/EPO—Jul. 10, 2023 (2201129WO).

* cited by examiner

DISPLAYING DIRECTIONAL VISUAL INDICATORS FROM A WEARABLE DEVICE FOR NAVIGATION

PRIORITY

This application is a continuation of U.S. patent application Ser. No. 17/723,401, entitled "DISPLAYING DIRECTIONAL VISUAL INDICATORS FROM A WEARABLE DEVICE FOR NAVIGATION," filed Apr. 18, 2022, assigned to the assignee hereof, and expressly incorporated by reference herein in its entirety.

TECHNICAL FIELD

This disclosure generally relates to the field of wireless communication, and more particularly, to displaying directional visual indicators from a wearable device for navigation.

DESCRIPTION OF THE RELATED TECHNOLOGY

Wireless communications systems are widely deployed to provide various types of communication content such as voice, video, packet data, messaging, broadcast, navigation, and so on. These systems may be capable of supporting communication with multiple users by sharing the available system resources (such as time, frequency, and power). The wireless communication systems may include cellular communication systems that may include a number of base stations (BSs), each simultaneously supporting communications for multiple communication devices, which may be otherwise known as user equipment (UE). The wireless communication systems also may include wireless local area networks (WLANs) that may be formed by two or more WLAN devices, which may include at least one station (STA) and at least one access point (AP). The wireless communication systems also may include satellite-based communication systems that may include one or more satellites and one or more wireless devices with navigation capabilities. The satellite-based communication systems may include global positioning system (GPS), global navigation satellite system (GLONASS), satellite-based augmentation system (SBAS), or a combination of satellite-based communication systems, such as a combination of GPS and GLONASS.

Wireless communication systems may be used by wireless devices (such as mobile phones and wearable devices) for positioning and navigation. The wireless devices typically receive a set of signals (such as navigation signals from satellites in the case of satellite-based communication systems, radio signals from BSs in the case of cellular communication systems, and radio signals from APs in the case of WLANs), analyze the received set of signals, and display navigation information to users.

SUMMARY

The systems, methods, and devices of this disclosure each have several innovative aspects, no single one of which is solely responsible for the desirable attributes disclosed herein.

One innovative aspect of the subject matter described in this disclosure can be implemented by a method for displaying directional visual indicators for navigation performed by a wearable device. The method may include receiving navigation signals while the wearable device is in a navigation mode. The navigation signals may indicate a direction of travel. The method may include displaying a first directional visual indicator corresponding to the direction of travel. The first directional visual indicator may be displayed external to the wearable device.

In some implementations, the first directional visual indicator displayed external to the wearable device may be a directional light or a directional projection displayed external to the wearable device in the direction of travel.

In some implementations, the directional projection may be a projection of a map associated with the navigation in the direction of travel, a projection of an arrow pointing in the direction of travel, or a projection of a text message indicating the direction of travel.

In some implementations, the directional light may be a static light, a moving light in the direction of travel, a sliding light, a flashing light, or a glowing light.

In some implementations, the method may further include, if the direction of travel may be changing from a first direction to a second direction, displaying a second directional visual indicator external to the wearable device and turning off the first directional visual indicator.

In some implementations, the method may further include, if the direction of travel may be changing from a first direction to a second direction, displaying a second directional visual indicator external to the wearable device from a first side section of the wearable device in the second direction and turning off the first directional visual indicator, and if the direction of travel may be changing from the first direction to a third direction, displaying a third directional visual indicator external to the wearable device from a second side section of the wearable device in the third direction and turning off the first directional visual indicator.

Another innovative aspect of the subject matter described in this disclosure can be implemented in a wearable device configured to display directional visual indicators for navigation. The wearable device may include one or more interfaces and one or more display modules. The one or more interfaces may be configured to receive navigation signals while the wearable device is in a navigation mode. The navigation signals may indicate a direction of travel. The one or more display modules may be configured to display a first directional visual indicator corresponding to the direction of travel. The first directional visual indicator may be displayed external to the wearable device.

In some implementations, if the direction of travel may be changing from a first direction to a second direction, the one or more display modules may be configured to display a second directional visual indicator external to the wearable device and turn off the first directional visual indicator.

In some implementations, the wearable device may further include one or more sensors configured to detect an emergency condition. The one or more display modules may be configured to display two or more directional visual indicators external to the wearable device from two or more sections of the wearable device in two or more directions in response to a detection of the emergency condition.

Another innovative aspect of the subject matter described in this disclosure can be implemented in an apparatus configured to display directional visual indicators for navigation. The apparatus may include means for receiving navigation signals while the apparatus is in a navigation mode. The navigation signals may indicate a direction of travel. The apparatus may include means for displaying a first directional visual indicator corresponding to the direction of travel. The first directional visual indicator may be displayed external to the apparatus Another innovative aspect of the subject matter described in this disclosure can be implemented in a non-transitory computer-readable medium having stored therein instructions which, when executed by a processor of a wearable device, may cause the wearable device to receive navigation signals while the wearable device is in a navigation mode. The navigation signals may indicate a direction of travel. The instructions, when executed by the processor of the wearable device, may cause the wearable device to display a first directional visual indicator corresponding to the direction of travel. The first directional visual indicator may be displayed external to the wearable device.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
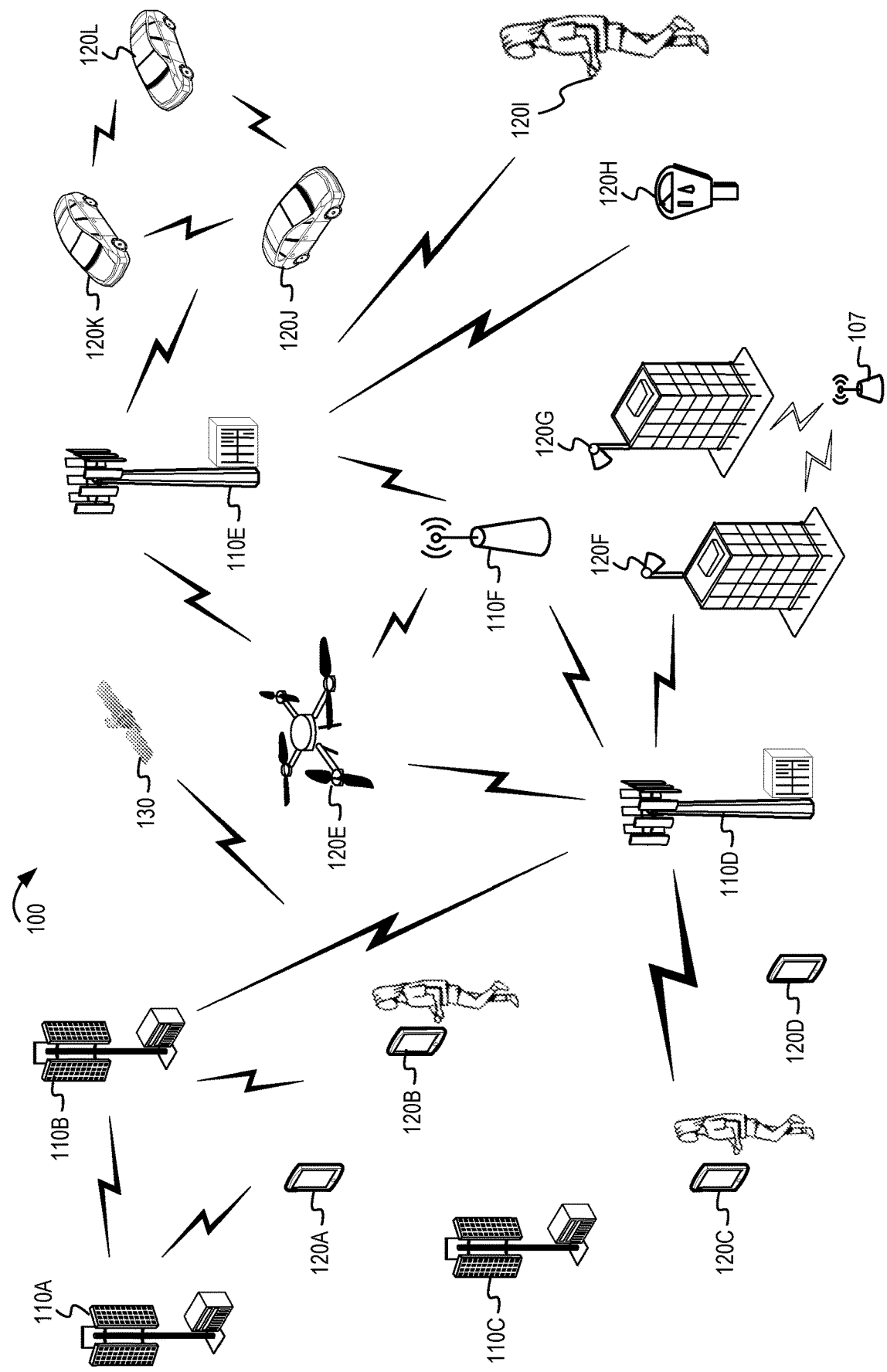
FIG. 1 shows a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5th Generation (5G) or new radio (NR), Advanced Mobile Phone Service (AMPS), global positioning system (GPS), global navigation satellite system (GLONASS), satellite-based augmentation system (SBAS), or other known signals that are used to communicate within a wireless, cellular or internet of things (IoT) network, such as a system utilizing 3G, 4G or 5G, or further implementations thereof, technology.

Users may use various types of electronic devices for navigation, such as mobile phones, wearable devices, and vehicle navigation systems. When a user uses a wearable device for navigation, the user may experience issues that result in a poor user experience. For example, since the display of a wearable device is typically small, a driver of an automobile may have a difficult time reading the navigation information on the display of the wearable device. Attempting to discern the navigation information while driving may be a hazard for a user of the wearable device, and may result in an accident. Also, if the driver cannot read the navigation information in the display of the wearable device, the driver may stop the vehicle to zoom in or to closely examine the displayed navigation information. This may waste valuable time and may delay the driver in reaching the destination.

In some implementations, a wearable device may display a directional visual indicator external to the wearable device during navigation. The directional visual indicator may correspond to the direction of travel during the navigation. For example, the wearable device may display a first directional visual indicator external to the wearable device that indicates a first direction of travel. When the direction of travel is about to change from a first direction (such as a North direction) to a second direction (such as a West direction), the wearable device may display a second directional visual indicator external to the wearable device that corresponds to a second direction of travel and turn off the first directional visual indicator.

In some implementations, the directional visual indicator may be a directional light or a directional projection displayed external to the wearable device in the direction of travel. For example, the directional projection may be a projection of a map for the navigation in the direction of travel, a projection of an arrow pointing in the direction of travel, a projection of a text message indicating the direction of travel, among other such types of projections. The directional light may be a static light, a moving light in the direction of travel, a sliding light, a flashing light, a blinking light, or a glowing light, etc. In some implementations, the wearable device may include two or more projectors that are used to display the directional projections external to the wearable device. In some implementations, the wearable device may include two or more light-emitting diode (LED) lights that are used to display the directional lights external to the wearable device.

In some implementations, when the direction of travel is about to change from a first direction (such as a North direction) to a second direction (such as a West direction), the wearable device may increase a light intensity of the displayed directional visual indicator (such as a directional light or a directional projection) as the wearable device gets closer to the change in the direction of travel. For example, when the wearable device is at a first distance from the location where the change in the direction of travel will occur, the wearable device may display the directional visual indicator using a first light intensity level. When the wearable device is at a second distance (which is closer than the first distance) from the change in the direction of travel, the wearable device may display the directional visual indicator using a second light intensity level that is higher than the first light intensity level. In some implementations, the wearable device may increase a blink or flash rate of the displayed directional visual indicator (such as a directional light or a directional projection) as the wearable device gets closer to the change in the direction of travel. In some implementations, the wearable device may increase both a light intensity and a blink or flash rate of the displayed directional visual indicator as the wearable device gets closer to the location where the change in the direction of travel will occur.

In some implementations, when the available power of the wearable device falls below a power level or the wearable device enters a power save mode, the wearable device may turn off the display and the projectors of the wearable device in order to save power. When the display and the projectors are turned off, the wearable device may use the LED lights to display the directional lights as the directional visual indicators, since the LED lights use less power compared to the display and the projectors.

In some implementations, two or more of the directional visual indicators may be displayed during emergency situations. For example, one or more of the sensors of the wearable device (such as one or more of an accelerometer, a gyroscope, a magnetometer, a heart rate monitor, etc.) may detect an emergency situation, such as a car crash involving the user of the wearable device or a sudden fall by the user of the wearable device. After detecting the emergency situation, the wearable device may display two or more directional visual indicators external to the wearable device having a red or orange color that may be visible at a distance. Also, the two or more directional visual indicators may begin to blink, flash, or glow after detecting the emergency situation.

Particular implementations of the subject matter described in this disclosure can be implemented to realize one or more of the following potential advantages. Implementing directional visual indicators that are displayed external to the main display of the wearable device during navigation may extend the display area for navigation information. Displaying directional visual indicators external to the wearable device may allow users to easily view the navigation information based on the extended display area and thus may improve navigation using the wearable device. Displaying directional visual indicators that correspond to the direction of travel may allow users to easily ascertain, observe or determine any changes in the direction of travel. Displaying directional visual indicators during an emergency situation may alert other people of a potential emergency situation from a distance, which may result in the user receiving assistance. Thus, implementing directional visual indicators that are displayed external to the wearable device in the direction of travel may improve navigation using wearable devices, which may improve the overall user experience during navigation. Also, implementing directional visual indicators during emergency situations may help to quickly resolve the emergency situations.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 also may include one or more wireless local area networks (WLANs) and one or more satellite-based communication systems. The wireless communication network 100 includes a number of base stations (BSs) 110 (individually labeled as 110A, 110B, 110C, 110D, 110E, and 110F) and other network entities. ABS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used.

A BS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. A BS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I (such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100. The wireless communication network 100 also may include one or more satellites 130 that are part of one or more satellite-based communication systems, such as one or more of a global positioning system (GPS), a global navigation satellite system (GLONASS), and a satellite-based augmentation system (SBAS). The satellites may provide long-range wireless connectivity to the UEs 120 of the wireless communication network.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
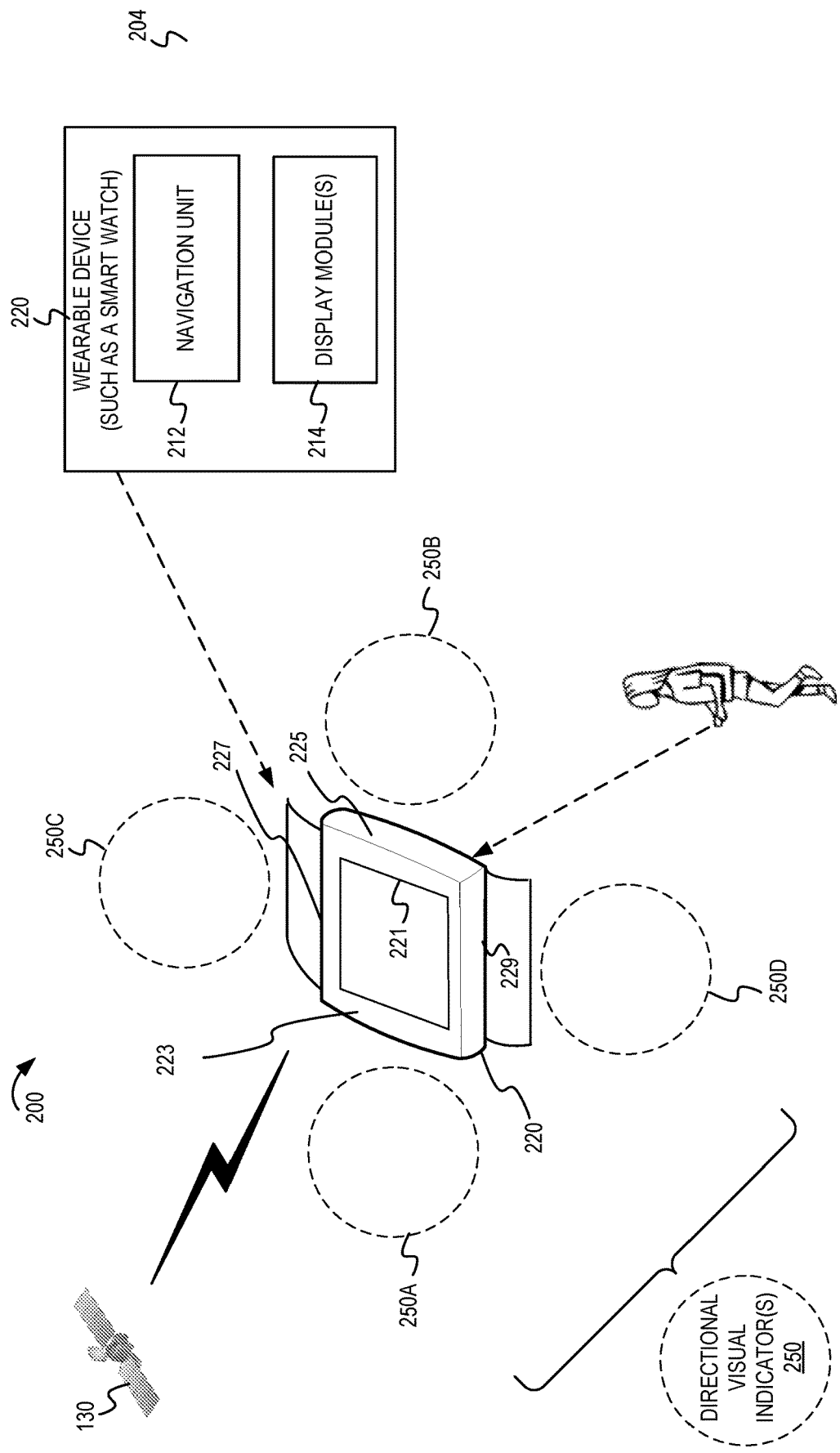
FIG. 2 shows a system diagram of an example wearable device configured to display directional visual indicators for navigation via a wireless communication network.

FIG. 2 shows a system diagram of an example wearable device configured to display directional visual indicators for navigation via a wireless communication network 200. The wireless communication network 200 shown in FIG. 2 may be an example of the wireless communication network 100 described in FIG. 1. The wireless communication network 200 may include a wearable device 220 and a satellite 130. Although not shown for simplicity, the wireless communication network 200 may include one or more additional satellites. The wearable device 220 may be one of various types of wearable devices, such as smart watches, fitness trackers, smart jewelry, implantable devices, augmented, virtual or extended reality glasses (AR/VR/XR headwear), etc. A user of the wearable device 220 may use the directional visual indicators for navigation in various activities, such as driving, trekking, military operations, mountain biking, fitness tasks, and emergency situations.

In some implementations, the wearable device 220 may include a navigation unit 212 and one or more display modules 214. The navigation unit 212 may receive and process navigation signals when the wearable device 220 is operating in a navigation mode. During the navigation mode, the navigation unit 212 may process the navigation signals to determine a position and a direction of travel of the wearable device 220. The navigation unit 212 may include navigation software that may work in conjunction with the one or more display modules to display a map showing the position and direction of travel of the wearable device 220 in a main display (such as a display 221) of the wearable device 220, as further described herein. The one or more display modules 214 may include one or more projectors and one or more LED lights that may be used to display directional visual indicators external to the wearable device 220 for navigation, as further described herein.

In some implementations, the satellite 130 may transmit navigation signals to the wearable device 220. For example, the satellite 130 may transmit navigation signals to the wearable device 220 when the wearable device 220 is in a navigation mode. In some implementations, the navigation signals may indicate a position and a direction of travel of the wearable device 220. For example, each navigation signal may indicate a GPS coordinate for the position of the wearable device 220, and two or more of the navigation signals may indicate the direction of travel. In some implementations, while the wearable device 220 is in the navigation mode, the wearable device 220 may continuously receive navigation signals that update the position and direction of travel of the wearable device 220 during navigation. During the navigation mode, the display 221 of the wearable device 220 may display the position, direction of travel, and other navigation and routing information within a map that is generated by a navigation software based on the received navigation signals.

Figure 6:
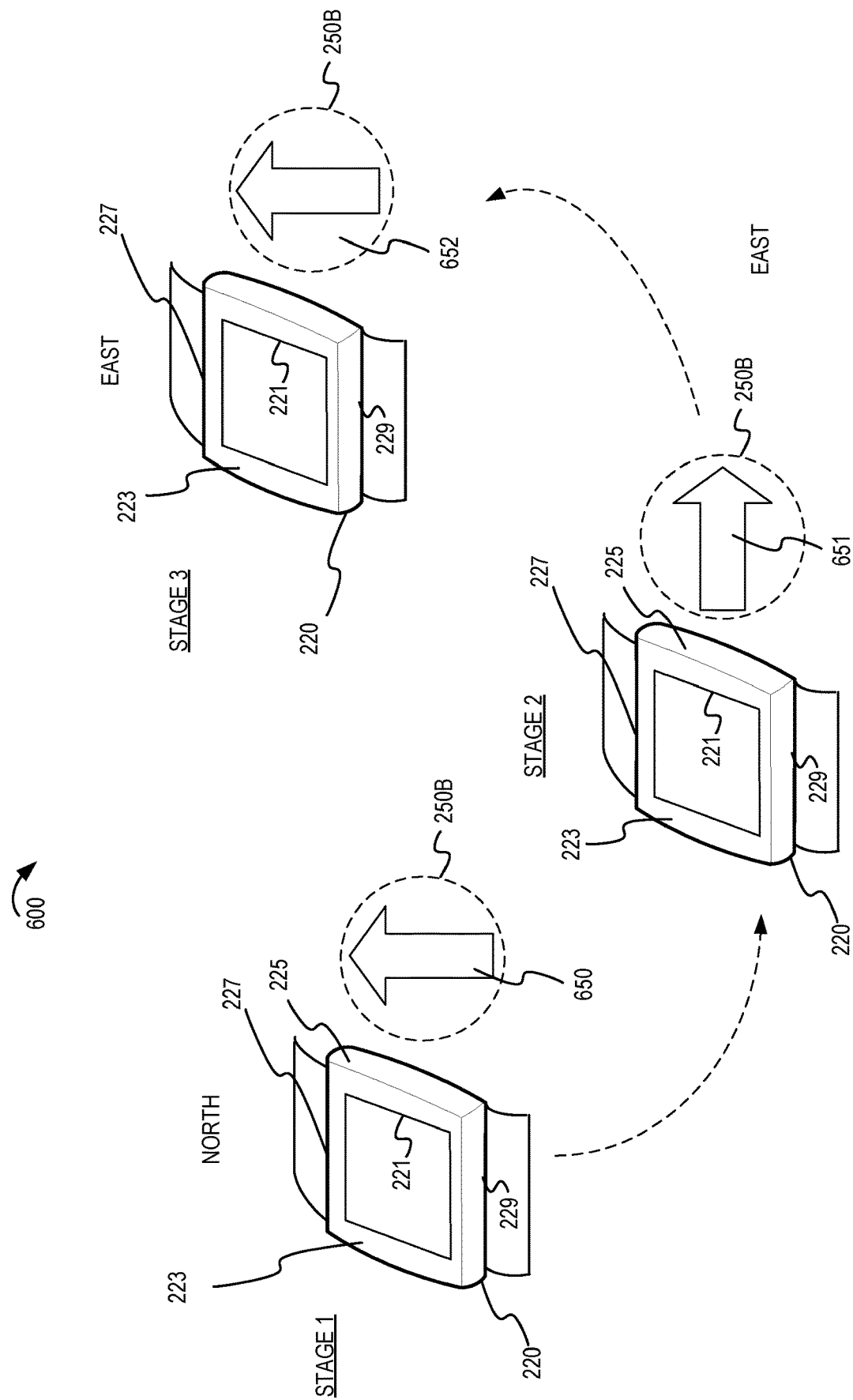
FIG. 6 shows a conceptual diagram of another example wearable device configured to display additional directional visual indicators.

In some implementations, the wearable device 220 may display a directional visual indicator corresponding to the direction of travel during navigation. The wearable device 220 may display the directional visual indicator external to the wearable device 220. For example, the wearable device 220 may display one of the directional visual indicators 250A-D that corresponds to the direction of travel. The directional visual indicators 250A-D collectively may be referred to as directional visual indicators 250 or individually may be referred to as a directional visual indicator 250. For example, the wearable device 220 may display a first directional visual indicator 250 (such as the directional visual indicator 250C) external to the wearable device 220 indicating a first direction of travel. When the direction of travel is about to change from a first direction (such as a North direction) to a second direction (such as an East direction), the wearable device 220 may display a second directional visual indicator 250 (such as the directional visual indicator 250B) external to the wearable device 220 in a second direction of travel and turn off the first directional visual indicator, as further described herein. In some implementations, the wearable device 220 may have one or more sections of the wearable device 220 that may display a directional visual indicator 250. For example, a first section 223 (such as a first side section) of the wearable device 220 may display a directional visual indicator 250A and a second section 225 (such as a second side section) of the wearable device 220 may display a directional visual indicator 250B. As another example, in addition to the directional visual indicators 250A and B, a third section 227 (such as a top section) of the wearable device 220 may display a directional visual indicator 250C and a fourth section 229 (such as a bottom section) of the wearable device 220 may display a directional visual indicator 250D. As another example, only one of the sections of the wearable device 220 (such as the first section 223, the second section 225, or the third section 227) may display a directional visual indicator 250. As described herein, the wearable device 220 may display any number of directional visual indicators, including, but not limited to eight directional visual indicators, as shown in FIG. 6.

In some implementations, when the direction of travel is about to change from the first direction (such as a North direction) to the second direction (such as an East direction), the second section 225 of the wearable device 220 may display the directional visual indicator 250B external to the wearable device 220 in the second direction of travel and the third section 227 of the wearable device 220 may turn off the directional visual indicator 250C. For example, if the wearable device 220 is a smart watch, the directional visual indicator 250B is displayed from the second section 225 of the wearable device 220 to a user's hand. When the direction of travel is about to change from the first direction (such as a North direction) to a third direction (such as a West direction), the first section 223 of the wearable device 220 may display the directional visual indicator 250A external to the wearable device 220 in the third direction of travel and the third section 227 of the wearable device 220 may turn off the directional visual indicator 250C. For example, if the wearable device 220 is a smart watch, the directional visual indicator 250A is displayed the first section 223 of the wearable device 220 to a user's arm. When the direction of travel is about to change from the first direction (such as a North direction) to a fourth direction (such as a South direction), the fourth section 229 of the wearable device 220 may display the directional visual indicator 250D external to the wearable device 220 in the fourth direction of travel and the third section 227 of the wearable device 220 may turn off the directional visual indicator 250C. When the direction of travel does not change and remains the same (such as a first or North direction), the third section 227 of the wearable device 220 may continue to display the directional visual indicator 250C external to the wearable device 220 in the first direction of travel.

In some implementations, the directional visual indicator 250 may be a directional light or a directional projection displayed external to the wearable device 220 in the direction of travel. For example, the directional projection may be a projection of a map for the navigation in the direction of travel, a projection of an arrow pointing in the direction of travel, or a projection of a text message indicating the direction of travel. The directional light may be a static light, a moving light in the direction of travel, a sliding light, a flashing light, or a glowing light. In some implementations, the directional visual indicator 250 may be a holographic projection. In some implementations, one or more of the sections of the wearable device 220 may include a projector that is configured to display a directional projection external to the wearable device 220, and one or more of the sections of the wearable device 220 may include one or more light-emitting diode (LED) lights that are configured to display a directional light external to the wearable device 220. For example, each of the first section 223, the second section 225, the third section 227, and the fourth section 229 of the wearable device 220 may include a projector that is configured to display a directional projection external to the wearable device 220, and each of the first section 223, the second section 225, the third section 227, and the fourth section 229 of the wearable device 220 may include one or more LED lights that are configured to display a directional light external to the wearable device 220. In some implementations, only the first section 223 and the second section 225 of the wearable device 220 may include a projector that is configured to display a directional projection external to the wearable device 220. As further described herein, the wearable device 220 may include any number of projectors and any number of LED lights, such as two or four projectors and four or eight LED lights, as shown in FIG. 6. In some implementations, the wearable device 220 may display a first projection of a map, a first projection of an arrow, or a first projection of a text message indicating the direction of travel as the directional visual indicator 250C. When the direction of travel is about to change from a first direction (such as a North direction) to a second direction (such as an East direction), the wearable device 220 may display a second projection of a map, a second projection of an arrow, or a second projection of a text message as the directional visual indicator 250B external to the wearable device 220 in a second direction of travel and turn off the directional visual indicator 250C. For example, the directional visual indicator 250C may be the first projection of an arrow pointing forward and indicating to continue in a straight or North direction, and the directional visual indicator 250B may be the second projection of an arrow pointing to the right and indicating to turn right or an East direction. In some implementations, the wearable device 220 may display a first static light, a first moving light, a first sliding light, a first flashing light, or a first glowing light indicating the direction of travel as the directional visual indicator 250C. When the direction of travel is about to change from a first direction (such as a North direction) to a second direction (such as an East direction), the wearable device 220 may display a second static light, a second moving light, a second sliding light, a second flashing light, or a second glowing light as the directional visual indicator 250B external to the wearable device 220 in a second direction of travel and turn off the directional visual indicator 250C. For example, the directional visual indicator 250C may be the first static light displayed from the third section 227 of the wearable device 220 and indicating to continue in a straight or North direction, and the directional visual indicator 250B may be the second static light displayed from the second section 225 of the wearable device 220 and indicating to turn right or an East direction.

In some implementations, if only one section of the wearable device 220 (such as the second section 225) displays a directional visual indicator 250, the same section of the wearable device 220 may display the updated directional visual indicator 250 when the direction of travel changes. For example, if the direction of travel is a first direction (such as a North direction), the wearable device 220 (such as the second section 225 of the wearable device 220) may display a directional visual indicator 250 (such as the directional visual indicator 250B) external to the wearable device 220 indicating a first direction of travel. For example, the directional visual indicator 250 may a projection of a map for the navigation indicating the first direction of travel, a projection of an arrow pointing in the first direction of travel, a projection of a text message indicating the first direction of travel, or a holographic projection indicating the direction of travel. When the direction of travel is about to change from the first direction (such as a North direction) to a second direction (such as an East direction), the same section of the wearable device 220 (such as the second section 225) may display the directional visual indicator 250 external to the wearable device 220 indicating the second direction of travel. For example, the projection of the arrow pointing in the first direction of travel may change to an arrow pointing to the second direction of travel. As another example, the projection of the text message indicating the first direction of travel may change to a text message indicating the second direction of travel.

In some implementations, when the direction of travel is about to change from a first direction (such as a North direction) to a second direction (such as an East direction), the wearable device 220 may increase a light intensity of the displayed directional visual indicator 250 (such as a directional light or a directional projection) as the wearable device 220 gets closer to the change in the direction of travel. For example, when the wearable device 220 is at a first distance (such as a first distance that is greater than 50 meters) from the location where the change in the direction of travel will occur, the wearable device 220 may display the directional visual indicator 250 using a first light intensity level (the lowest light intensity level). When the wearable device 220 is at a second distance (such as a second distance that is between 30 meters to 50 meters) from the change in the direction of travel, the wearable device 220 may display the directional visual indicator 250 using a second light intensity level. When the wearable device 220 is at a third distance (such as a third distance that is between 15 meters to 30 meters) from the change in the direction of travel, the wearable device 220 may display the directional visual indicator 250 using a third light intensity level. When the wearable device 220 is at a fourth distance (such as a fourth distance that is between 0 meters to 15 meters) from the change in the direction of travel, the wearable device 220 may display the directional visual indicator 250 using a fourth light intensity level (the highest light intensity level). In some implementations, when the wearable device 220 at the fourth distance (such as the fourth distance that is between 0 meters to 15 meters) from the change in the direction of travel, the wearable device 220 may start blinking the directional visual indicator 250. In some implementations, when the wearable device 220 at the fourth distance (such as the fourth distance that is between 0 meters to 15 meters) from the change in the direction of travel, the wearable device 220 may display the directional visual indicator 250 using the fourth light intensity level (the highest light intensity level) and may start blinking the directional visual indicator 250. In some implementations, the wearable device 220 may increase a blink rate of the displayed directional visual indicator 250 (such as a directional light or a directional projection) as the wearable device 220 gets closer to the change in the direction of travel. In some implementations, the wearable device 220 may start blinking the directional visual indicator 250 or may increase the light intensity level of the of the directional visual indicator 250 based on other conditions, such as weather conditions. For example, if the wearable device 220 detects a bright and sunny day (such as based on a detected light intensity from the sun), the wearable device 220 may start blinking the directional visual indicator 250, or may increase the light intensity level of the of the directional visual indicator 250, or both.

In some implementations, when the available power (which may be referred to as the available battery power) of the wearable device 220 falls below a power level (or power threshold) or the wearable device 220 enters a power save mode, the wearable device 220 may turn off the display and the projectors of the wearable device 220 in order to save power. When the display and the projectors are turned off, the wearable device 220 may use the LED lights to display the directional lights as the directional visual indicators 250, since the LED lights use less power compared to the display and the projectors.

In some implementations, two or more of the directional visual indicators 250 may be displayed during emergency situations. For example, one or more of the sensors of the wearable device 220 (such as one or more of an accelerometer, a gyroscope, a magnetometer, and a heart rate monitor) may detect an emergency situation, such as a car crash involving the user of the wearable device 220 or a sudden fall by the user of the wearable device 220. After detecting the emergency situation, the wearable device 220 may display two or more directional visual indicators 250 external to the wearable device 220. For example, the wearable device 220 may display two or more directional visual indicators 250 external to the wearable device 220 having a red or orange color. The two or more directional visual indicators 250 also may blink, flash, or glow. The red or orange color of the directional visual indicators 250 and the blinking, flashing or glowing of the directional visual indicators 250 may be visible from a distance (especially in the dark or low light conditions) and thus may bring help to the user of the wearable device 220 that may be in an emergency situation. In some implementations, the two or more directional visual indicators 250 may be two or more directional lights, two or more directional projections, or at least one directional light and at least one directional projection.

Figure 3:
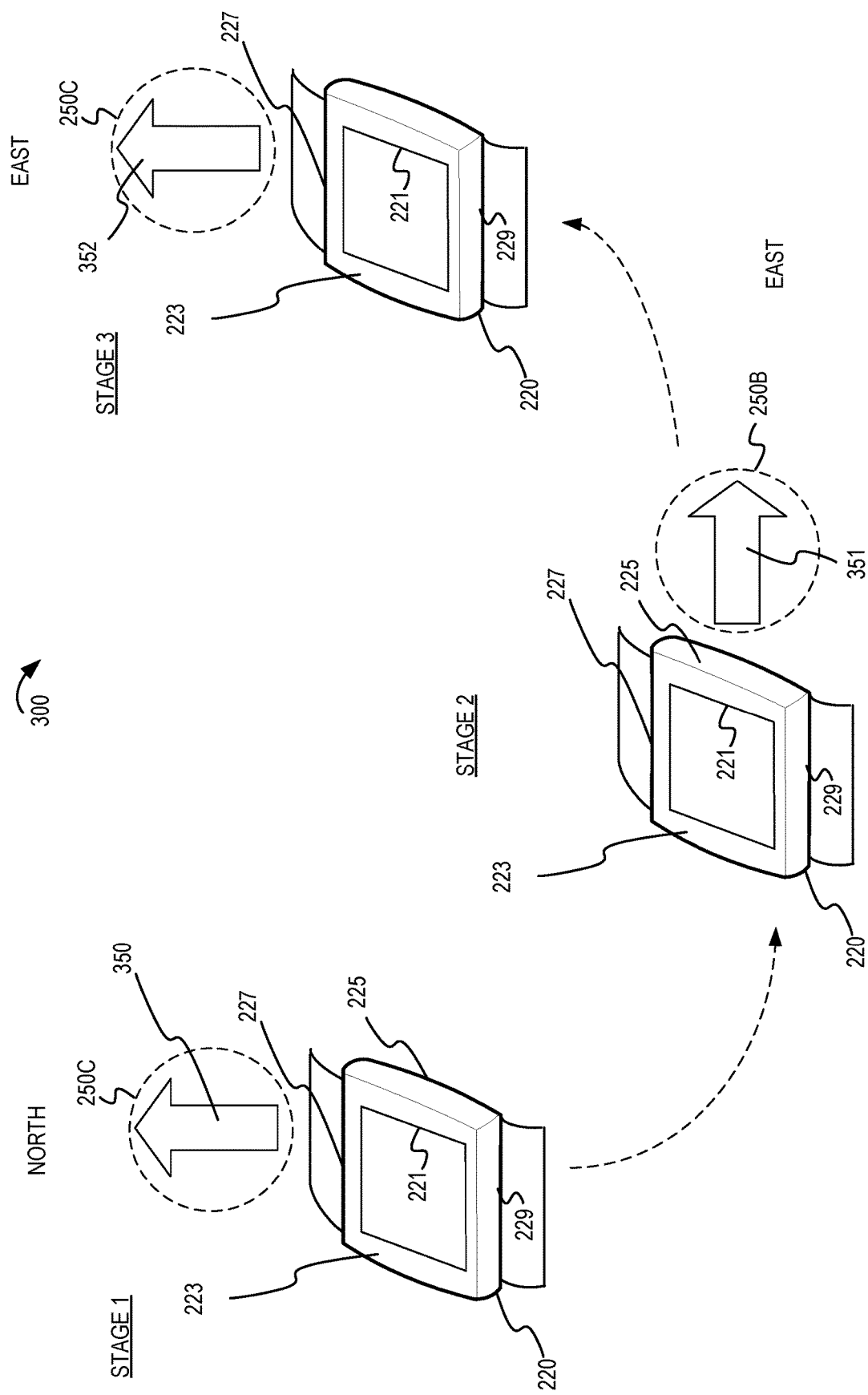
FIG. 3 shows a conceptual diagram of an example wearable device configured to display directional visual indicators to indicate a change in the direction of travel during navigation.

FIG. 3 shows a conceptual diagram 300 of an example wearable device configured to display directional visual indicators to indicate a change in the direction of travel during navigation. As described in FIG. 2, the wearable device 220 may include a display 221 and a first section 223 (such as a first side section), a second section 225 (such as a second side section), a third section 227 (such as a top section), a fourth section 229 (such as a bottom section) of the wearable device 220 that may display directional visual indicators 250.

In some implementations, at stage 1, the third section 227 of the wearable device 220 may display a directional projection, such as a first projection of an arrow 350 external to the wearable device 220 as the directional visual indicator 250C indicating the direction of travel. For example, the direction of travel may be a first direction, such as a straight or North direction. At stage 2, when the direction of travel is about to change from the first direction (such as a North direction) to a second direction (such as an East direction or turn right), the second section 225 of the wearable device 220 may display a second projection of an arrow 351 as the directional visual indicator 250B in a second direction of travel and turn off the first projection of an arrow 350 (the directional visual indicator 250C). As described in FIG. 2, in some implementations, when the direction of travel is about to change from the first direction to the second direction, the wearable device 220 may increase a light intensity or a blink rate of the displayed directional visual indicator 250B (such as the second projection of the arrow 351) as the wearable device 220 gets closer to the location where the change in the direction of travel will occur. For example, when the direction of travel is about to change from the North direction to the East direction, the wearable device 220 may increase a light intensity or a blink rate of the second projection of the arrow 351 as the wearable device 220 gets closer to the location where the direction of travel will change from the North direction to the East direction, such as the location where the user will turn right in the East direction. At stage 3, after the direction of travel changes from the first direction (such as the North direction) to the second direction (such as the East direction), the third section 227 of the wearable device 220 may display a third projection of an arrow 352 as the directional visual indicator 250C in the second direction of travel (such as the East direction) and turn off the second projection of the arrow 351 (the directional visual indicator 250B).

Figure 4:
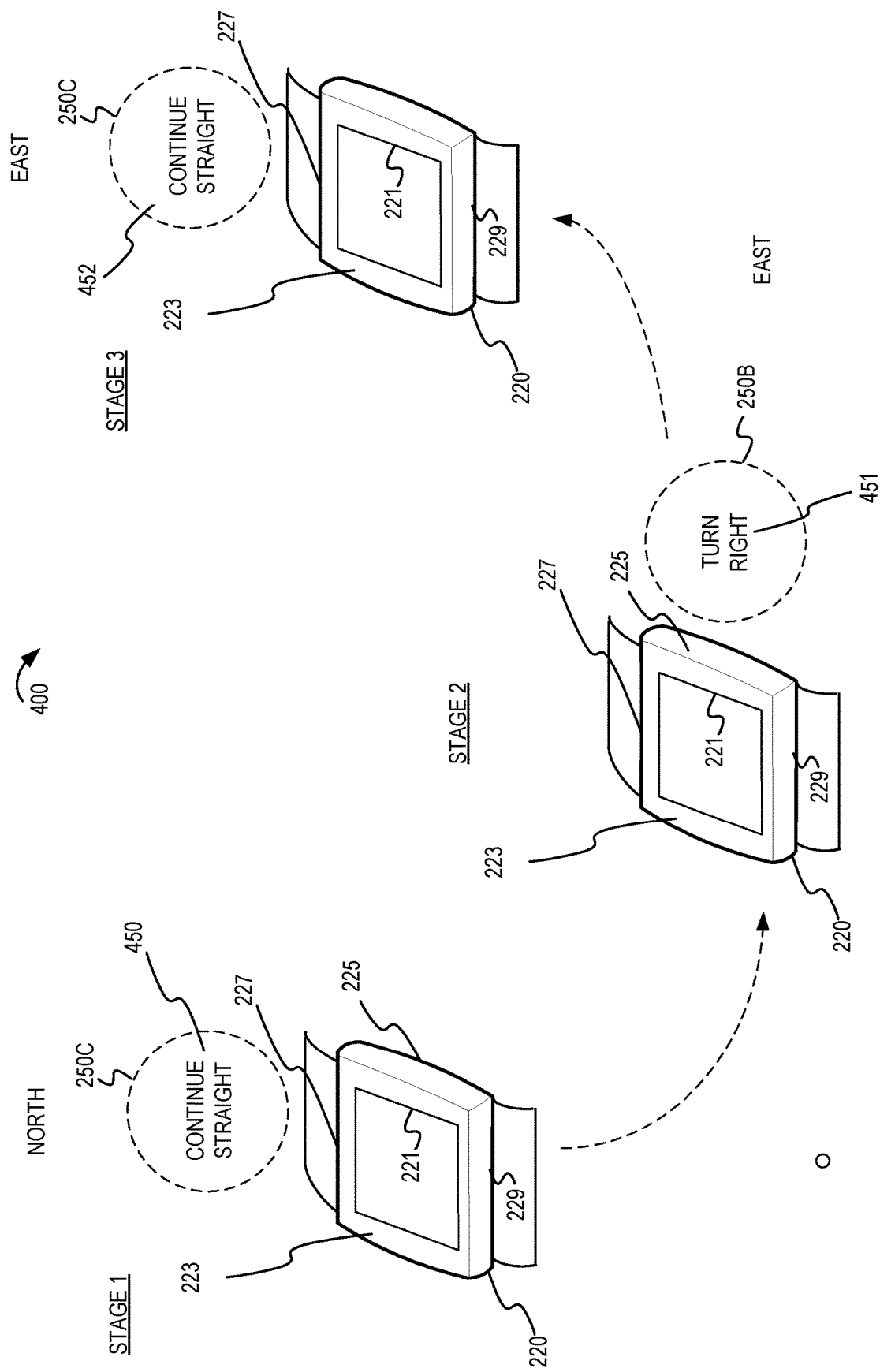
FIG. 4 shows a conceptual diagram of another example wearable device configured to display directional visual indicators to indicate a change in the direction of travel during navigation.

FIG. 4 shows a conceptual diagram 400 of another example wearable device configured to display directional visual indicators to indicate a change in the direction of travel during navigation. As described in FIG. 2, the wearable device 220 may include a display 221 and a first section 223 (such as a first side section), a second section 225 (such as a second side section), a third section 227 (such as a top section), a fourth section 229 (such as a bottom section) of the wearable device 220 that may display directional visual indicators 250.

In some implementations, at stage 1, the third section 227 of the wearable device 220 may display a directional projection, such as a first projection of a text message 450 external to the wearable device 220 as the directional visual indicator 250C indicating the direction of travel. For example, the direction of travel may be a first direction, such as a straight or North direction, and the first projection of the text message 450 may indicate to "continue straight" or continue in a North direction. At stage 2, when the direction of travel is about to change from the first direction (such as the North direction) to a second direction (such as the East direction or turn right), the second section 225 of the wearable device 220 may display a second projection of a text message 451 as the directional visual indicator 250B in a second direction of travel and turn off the first projection of the text message 450 (the directional visual indicator 250C). For example, the second projection of the text message 451 may indicate to "turn right" or turn in an East direction. As described in FIG. 2, in some implementations, when the direction of travel is about to change from the first direction to the second direction, the wearable device 220 may increase a light intensity or a blink rate of the displayed directional visual indicator 250B (such as the second projection of the text message 451) as the wearable device 220 gets closer to the location where the change in the direction of travel will occur. For example, when the direction of travel is about to change from the North direction to the East direction, the wearable device 220 may increase a light intensity or a blink rate of the second projection of the text message 451 as the wearable device 220 gets closer to the location where the direction of travel will change from the North direction to the East direction, such as the location where the user will turn right in the East direction. At stage 3, after the direction of travel changes from the first direction (such as the North direction) to the second direction (such as the East direction), the third section 227 of the wearable device 220 may display a third projection of a text message 452 as the directional visual indicator 250C in the second direction of travel (such as the East direction) and turn off the second projection of the text message 451 (the directional visual indicator 250B). For example, the third projection of the text message 452 may indicate to "continue straight" or continue in the East direction.

Figure 5:
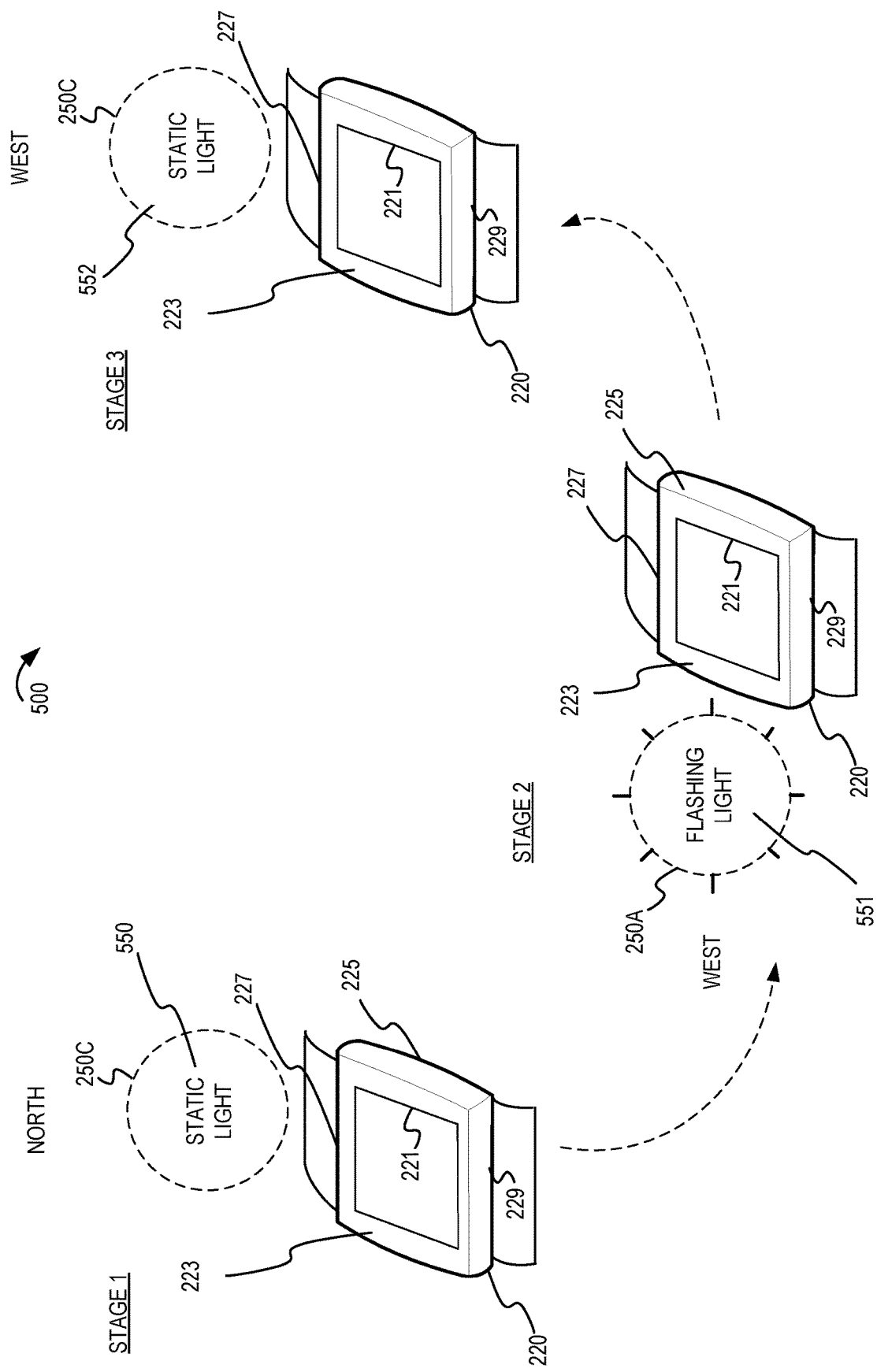
FIG. 5 shows a conceptual diagram of another example wearable device configured to display directional visual indicators to indicate a change in the direction of travel during navigation.

FIG. 5 shows a conceptual diagram 500 of another example wearable device configured to display directional visual indicators to indicate a change in the direction of travel during navigation. As described in FIG. 2, the wearable device 220 may include a display 221 and a first section 223 (such as a first side section), a second section 225 (such as a second side section), a third section 227 (such as a top section), a fourth section 229 (such as a bottom section) of the wearable device 220 that may display directional visual indicators 250.

In some implementations, at stage 1, the third section 227 of the wearable device 220 may display a directional light, such as a static light 550 external to the wearable device 220 as the directional visual indicator 250C indicating the direction of travel. For example, the direction of travel may be a first direction, such as a straight or North direction. At stage 2, when the direction of travel is about to change from the first direction (such as the North direction) to a third direction (such as the West direction or turn left), the first section 223 of the wearable device 220 may display a flashing light 551 as the directional visual indicator 250A in a third direction of travel and turn off the static light 550 (the directional visual indicator 250A). For example, the flashing light 551 being displayed as the directional visual indicator 250A may indicate to "turn left" or turn in a West direction. As described in FIG. 2, in some implementations, when the direction of travel is about to change from the first direction to the third direction, the wearable device 220 may increase a light intensity or a blink rate (or flash rate) of the displayed directional visual indicator 250A (such as the flashing light 551) as the wearable device 220 gets closer to the location where the change in the direction of travel will occur. At stage 3, after the direction of travel changes from the first direction (such as the North direction) to the third direction (such as the West direction), the third section 227 of the wearable device 220 may display a static light 552 as the directional visual indicator 250C in the third direction of travel (such as the West direction) and turn off the flashing light 551 (the directional visual indicator 250A). For example, the static light 552 may indicate to "continue straight" or continue in the West direction.

FIG. 6 shows a conceptual diagram 600 of another example wearable device configured to display directional visual indicators to indicate a change in the direction of travel during navigation. The wearable device 220 may include a display 221 and a first section 223 (such as a first side section), a second section 225 (such as a second side section), a third section 227 (such as a top section), a fourth section 229 (such as a bottom section) of the wearable device 220. In some implementations, at least one section of the wearable device 220 (such as the second section 225) may display a directional visual indicator 250.

In some implementations, only one of the sections of the wearable device 220 (such as the second section 225) may display a directional visual indicator 250. At stage 1, the second section 225 of the wearable device 220 may display a directional projection, such as a first projection of an arrow 650 external to the wearable device 220 as the directional visual indicator 250B indicating the direction of travel. For example, the direction of travel may be a first direction, such as a straight or North direction. Although the projection of an arrow is shown in FIG. 6, the directional projection may be a projection of a text message indicating the direction of travel or a holographic projection indicating the direction of travel. At stage 2, when the direction of travel is about to change from the first direction (such as a North direction) to a second direction (such as an East direction or turn right), the second section 225 of the wearable device 220 may display a second projection of an arrow 651 as the directional visual indicator 250B in a second direction of travel and turn off the first projection of the arrow 650. The second section 225 of the wearable device 220 may stop displaying the first projection of the arrow 650 and begin displaying the second projection of the arrow 651 that indicates the second direction of travel (such as an East direction or turn right). As described in FIG. 2, in some implementations, when the direction of travel is about to change from the first direction to the second direction, the wearable device 220 may increase a light intensity or a blink rate of the displayed directional visual indicator 250B (such as the second projection of the arrow 651) as the wearable device 220 gets closer to the location where the change in the direction of travel will occur. At stage 3, after the direction of travel changes from the first direction (such as the North direction) to the second direction (such as the East direction), the second section 225 of the wearable device 220 may display a third projection of an arrow 652 as the directional visual indicator 250B in the second direction of travel (such as the East direction) and turn off the second projection of the arrow 651. The second section 225 of the wearable device 220 may stop displaying the second projection of the arrow 651 and begin displaying the third projection of the arrow 652.

Figure 7:
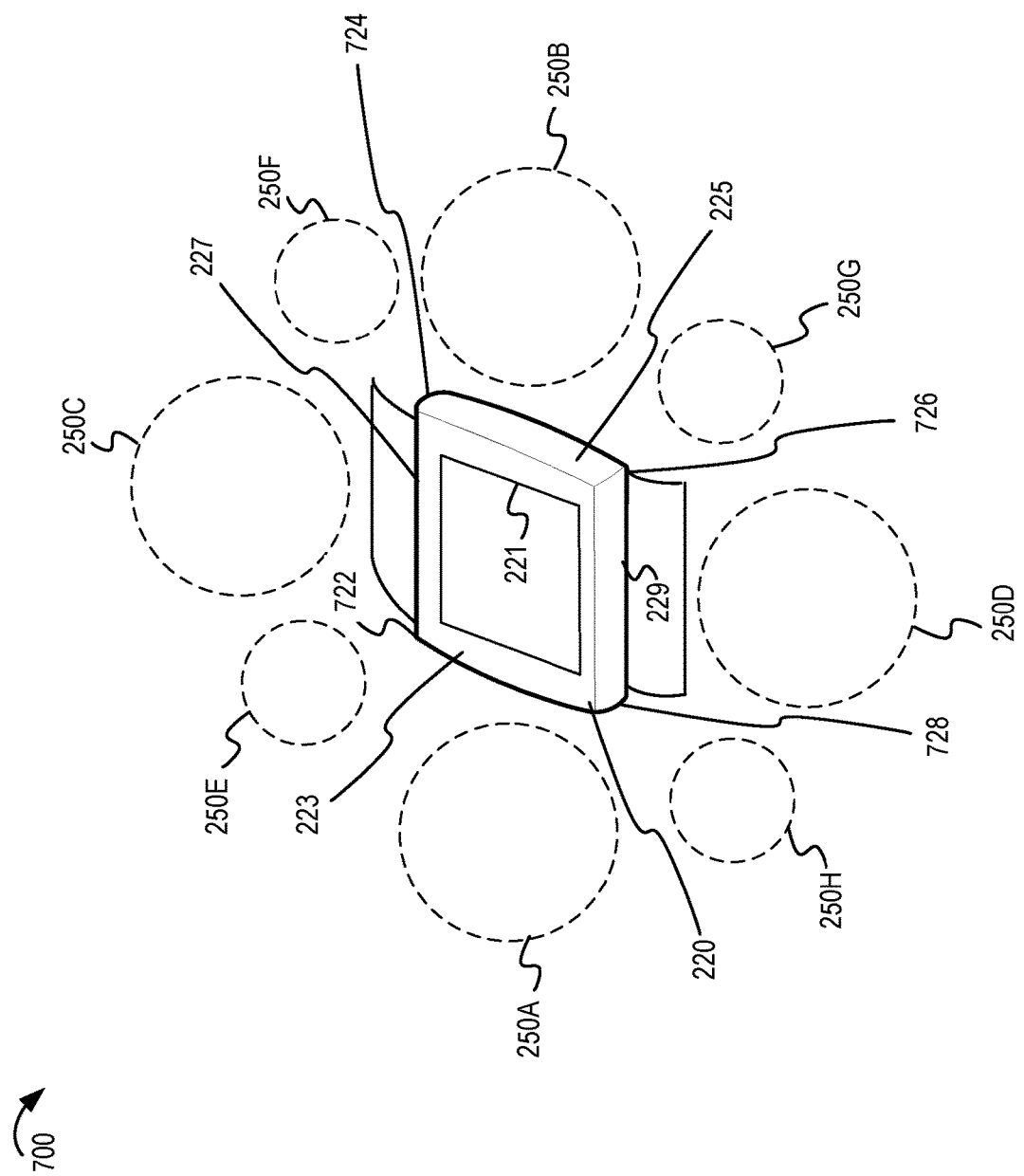
FIG. 7 shows a conceptual diagram of another example wearable device configured to display directional visual indicators to indicate an emergency situation.

FIG. 7 shows a conceptual diagram 700 of another example wearable device configured to display additional directional visual indicators. As described in FIG. 2, in some implementations, the wearable device 220 may have one or more sections of the wearable device 220 that may display a directional visual indicator 250. For example, a first section 223 (such as a first side section) of the wearable device 220 may display a directional visual indicator 250A and a second section 225 (such as a second side section) of the wearable device 220 may display a directional visual indicator 250B. In addition to the directional visual indicators 250A and B, a third section 227 (such as a top section) of the wearable device 220 may display a directional visual indicator 250C and a fourth section 229 (such as a bottom section) of the wearable device 220 may display a directional visual indicator 250D.

As shown in FIG. 7, the wearable device 220 may display a total of eight directional visual indicators 250. In addition to the directional visual indicators 250A-D, the wearable device 220 may display directional visual indicators 250E-H. For example, a fifth section 722 (such as a first corner section) of the wearable device 220 may display a directional visual indicator 250E, a sixth section 724 (such as a second corner section) of the wearable device 220 may display a directional visual indicator 250F, a seventh section 726 (such as a third corner section) of the wearable device 220 may display a directional visual indicator 250G, and an eighth section 728 (such as a fourth corner section) of the wearable device 220 may display a directional visual indicator 250H. The wearable device 220 may display at least one of the directional visual indicators 250A-H for navigation similarly as described with reference to FIGS. 2-6.

Figure 8:
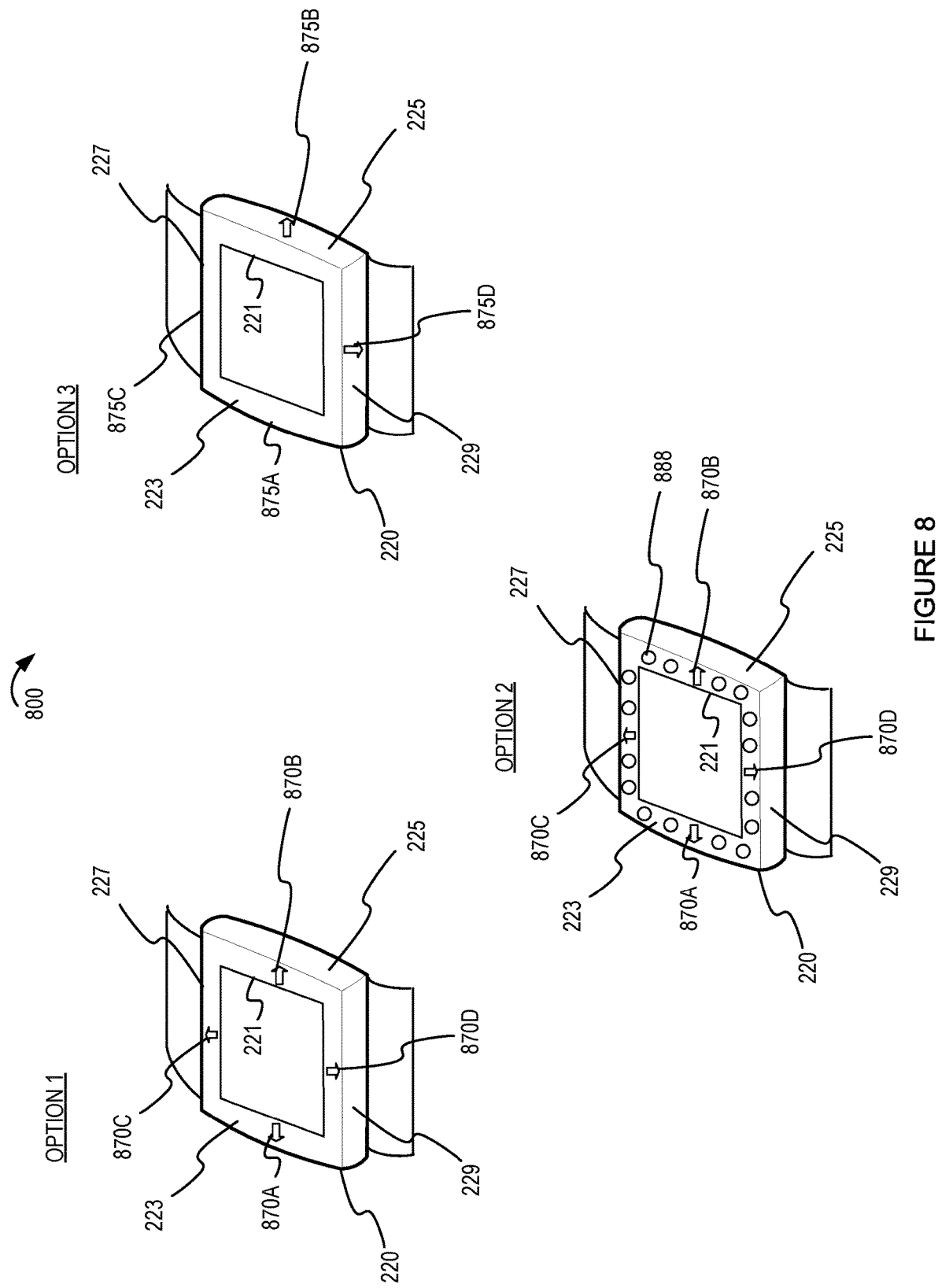
FIG. 8 depicts a flowchart with example operations performed by a wearable device to display directional visual indicators for navigation.

FIG. 8 shows conceptual diagrams 800 of another example wearable device including LED lights that are configured to display directional visual indicators. As described in FIG. 2, the wearable device 220 may include a display 221 and a first section 223 (such as a first side section), a second section 225 (such as a second side section), a third section 227 (such as a top section), a fourth section 229 (such as a bottom section) of the wearable device 220 that may display directional visual indicators.

In some implementations, the wearable device 220 may include one or more LED lights that are configured to display directional visual indicators. For example, as shown in option 1 of FIG. 8, the wearable device 220 may include four LED lights 870A-D that are configured to display directional visual indicators. The first LED light 870A may be located in the first section 223, the second LED light 870B may be located in the second section 225, the third LED light 870C may be located in the third section 227, and the fourth LED light 870D may be located in the fourth section 229 of the wearable device 220. The four LED lights 870A-D may be any type of LED lights having various shapes, such as the arrow shape shown in FIG. 8. As another example, as shown in option 2 of FIG. 8, the wearable device 220 may include sliding lights 888 in addition to the four LED lights 870A-D that are configured to display directional visual indicators. As another example, as shown in option 3 of FIG. 8, the wearable device 220 may include four LED lights 875A-D that are configured to display directional visual indicators. The first LED light 875A may be located in a different face of the first section 223, the second LED light 875B may be located in a difference face of the second section 225, the third LED light 875C (not shown) may be located in a different face of the third section 227, and the fourth LED light 875D (not shown) may be located in a different face of the fourth section 229 of the wearable device 220. The four LED lights 875A-D may be any type of LED lights having various shapes, such as the arrow shape shown in FIG. 8.

Figure 9:
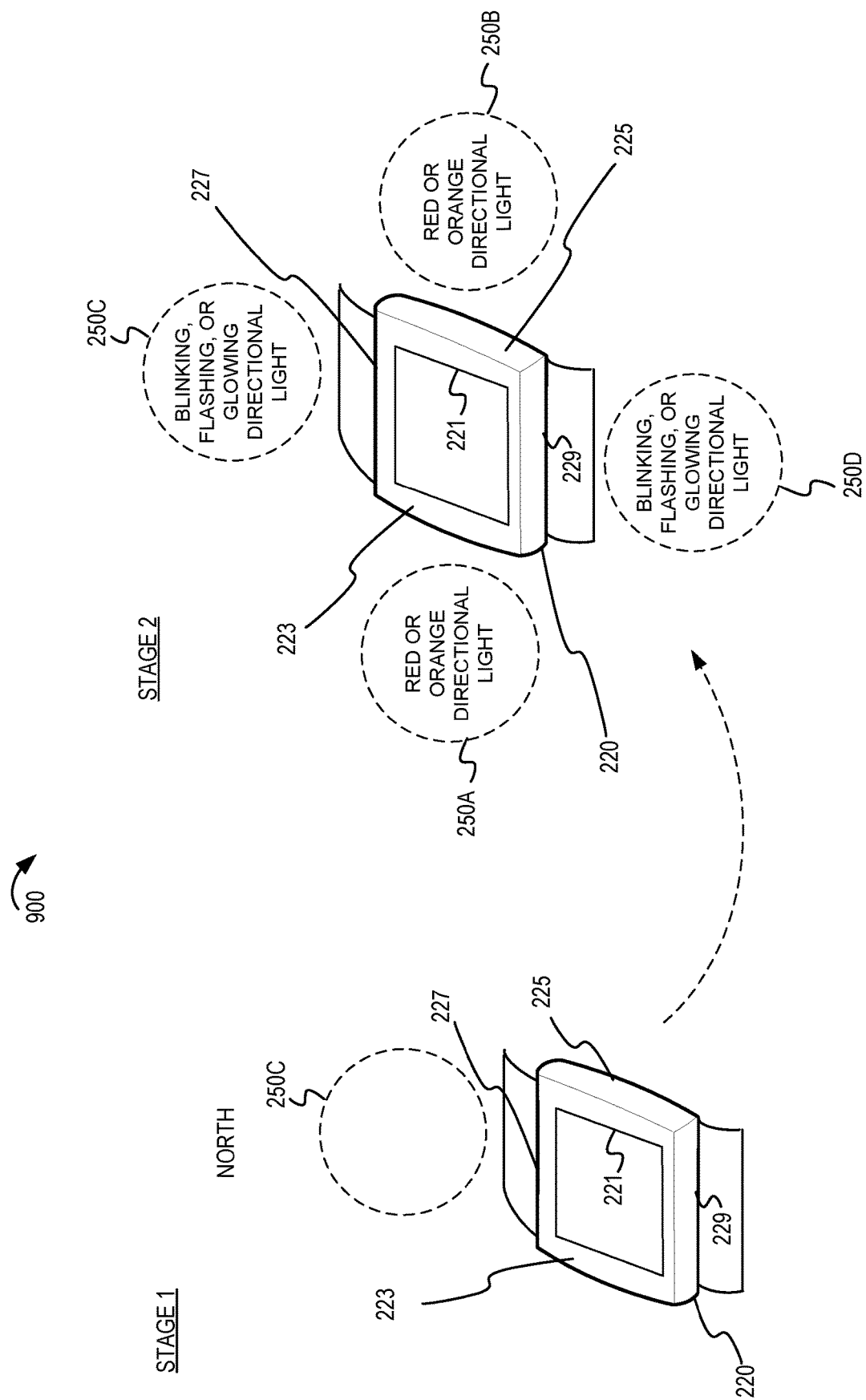
FIG. 9 shows a conceptual diagram of another example wearable device configured to display directional visual indicators to indicate an emergency situation.

FIG. 9 shows a conceptual diagram 900 of another example wearable device configured to display directional visual indicators to indicate an emergency situation. As described in FIG. 2, the wearable device 220 may include a display 221 and a first section 223 (such as a first side section), a second section 225 (such as a second side section) a third section 227 (such as a top section), a fourth section 229 (such as a bottom section) of the wearable device 220 that may display directional visual indicators 250.

In some implementations, at stage 1, the third section 227 of the wearable device 220 may display a directional projection or a directional light external to the wearable device 220 as the directional visual indicator 250C indicating the direction of travel (such as the North direction). In some implementations, at stage 2, when the wearable device 220 detects an emergency situation, the wearable device 220 may display two or more directional visual indicators 250 external to the wearable device 220. For example, one or more of the sensors of the wearable device 220 (such as one or more of an accelerometer, a gyroscope, a magnetometer, and a heart rate monitor) may detect an emergency situation, such as a car crash involving the user of the wearable device 220 or a sudden fall by the user of the wearable device 220. In some implementations, after detecting the emergency situation, the wearable device 220 may display two or more directional visual indicators 250 external to the wearable device 220 having a red or orange color. The two or more directional visual indicators 250 also may blink, flash, or glow. For example, the directional visual indicators 250A and 250B may be displayed as directional lights having a red or orange color, and the directional visual indicators 250C and 250D may be displayed as directional lights that blink, flash, or glow. As another example, the directional visual indicators 250A-D may be displayed as directional lights or directional projections having a red or orange color that also blink, flash, or glow. The red or orange color of the two or more directional visual indicators 250 and the blinking, flashing or glowing of the two or more directional visual indicators 250 may be visible from a distance and thus may bring help to the user of the wearable device 220 that may be in an emergency situation. In some implementations, the two or more directional visual indicators 250 may be two or more directional lights, two or more directional projections, or at least one directional light and at least one directional projection.

Figure 10:
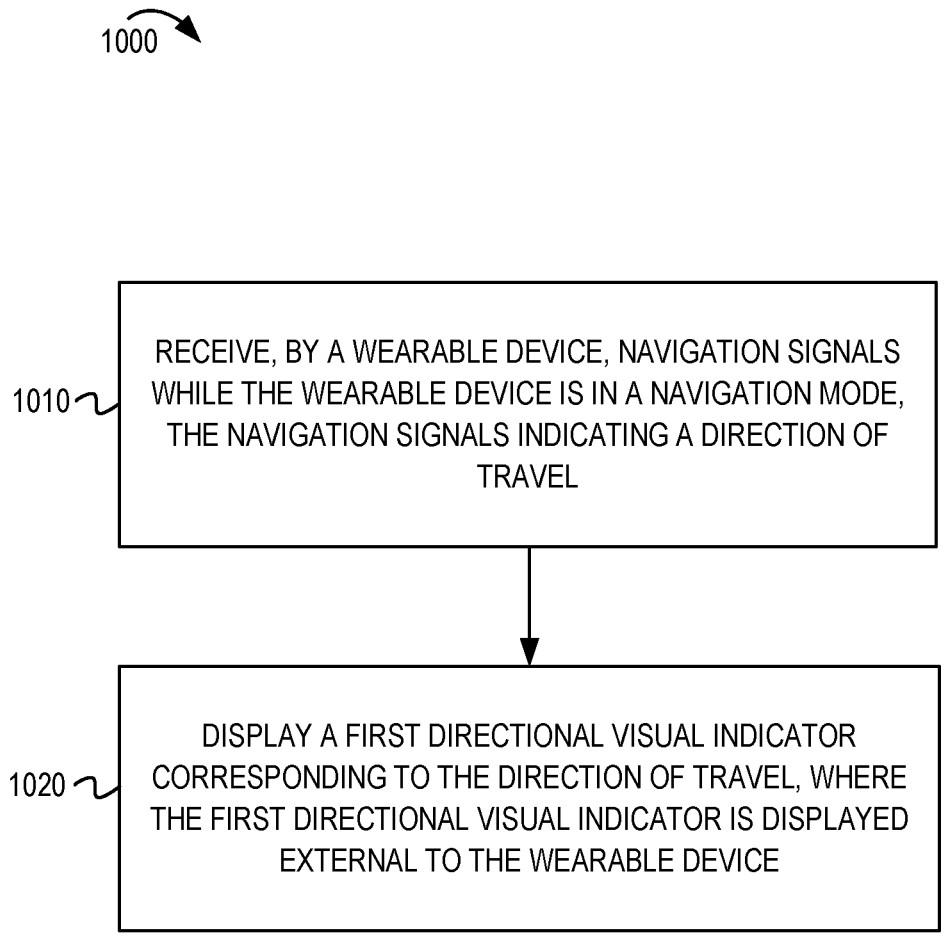
FIG. 10 depicts a flowchart with example operations performed by a wearable device to display directional visual indicators for navigation.

FIG. 10 depicts a flowchart 1000 with example operations performed by a wearable device to display directional visual indicators for navigation.

At block 1010, a wearable device (such as the wearable device 220 shown in FIG. 2) may receive navigation signals while the wearable device is in a navigation mode. The navigation signals may indicate a direction of travel.

At block 1020, the wearable device may display a first directional visual indicator corresponding to the direction of travel. The first directional visual indicator may be displayed external to the wearable device.

Figure 11:
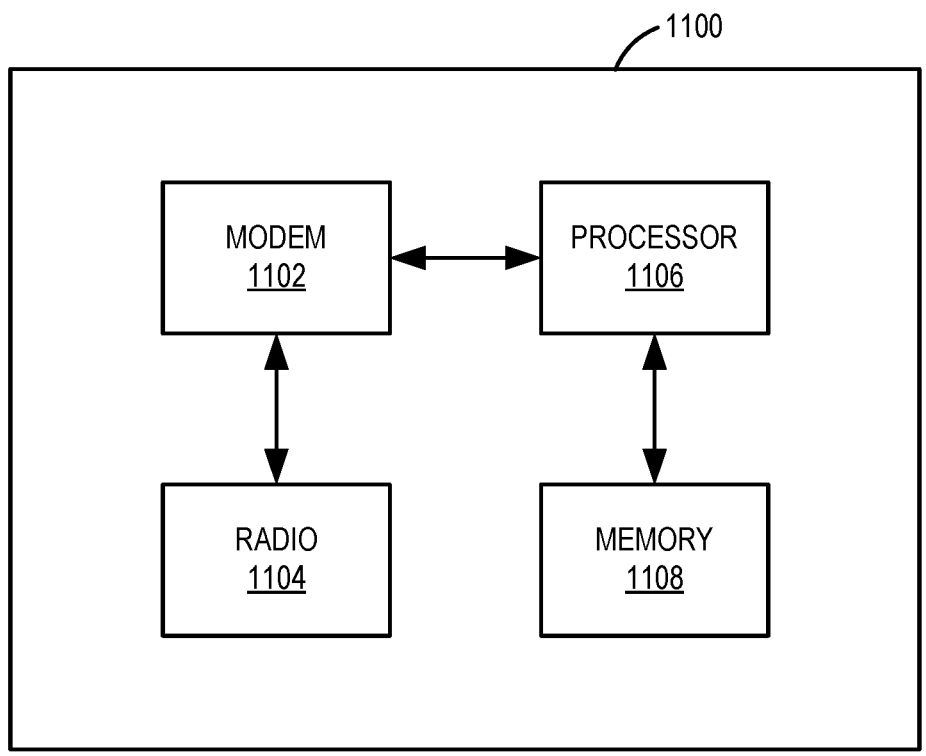
FIG. 11 shows a block diagram of an example wireless communication device.

FIG. 11 shows a block diagram of an example wireless communication device 1100. In some implementations, the wireless communication device 1100 can be an example of a device for use in a wearable device such as the wearable device 220 described herein. The wireless communication device 1100 may be generally referred to as an apparatus or a wireless communication apparatus. The wireless communication device 1100 is capable of transmitting (or outputting for transmission) and receiving wireless communications (for example, in the form of wireless packets). For example, the wireless communication device 1100 can be configured to transmit and receive navigation signals from one or more satellites that are part of one or more satellite-based communication systems, such as one or more of a global positioning system (GPS), a global navigation satellite system (GLONASS), and a satellite-based augmentation system (SBAS). As another example, the wireless communication device 1100 can be configured to transmit and receive packets in the form of PPDUs and MPDUs conforming to an IEEE 802.11 standard, such as that defined by the IEEE 802.11-2016 specification or amendments thereof including, but not limited to, 802.11ac, 802.11ah, 802.11ad, 802.11 ay, 802.11ax, 802.11az, 802.11ba and 802.11be.

The wireless communication device 1100 can be, or can include, a chip, system on chip (SoC), chipset, package or device that includes one or more modems 1102, for example, a Wi-Fi (IEEE 802.11 compliant) modem. In some implementations, the one or more modems 1102 (collectively "the modem 1102") additionally include a WWAN modem (for example, a 3GPP 4G LTE or 5G compliant modem). In some implementations, the wireless communication device 1100 also includes one or more radios 1104 (collectively "the radio 1104"). In some implementations, the wireless communication device 1100 further includes one or more processors, processing blocks or processing elements (collectively "the processor 1106") and one or more memory blocks or elements (collectively "the memory 1108"). In some implementations, the processor 1106 and the memory 1108 may be referred to as the processing system.

The modem 1102 can include an intelligent hardware block or device such as, for example, an application-specific integrated circuit (ASIC) among other possibilities. The modem 1102 is generally configured to implement a PHY layer. For example, the modem 1102 is configured to modulate packets and to output the modulated packets to the radio 1104 for transmission over the wireless medium. The modem 1102 is similarly configured to obtain modulated packets received by the radio 1104 and to demodulate the packets to provide demodulated packets. In addition to a modulator and a demodulator, the modem 1102 may further include digital signal processing (DSP) circuitry, automatic gain control (AGC), a coder, a decoder, a multiplexer and a demultiplexer. For example, while in a transmission mode, data obtained from the processor 1106 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1104. In implementations involving beamforming, the modulated symbols in the respective spatial streams are precoded via a steering matrix prior to their provision to the IFFT block.

While in a reception mode, digital signals received from the radio 1104 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1106) for processing, evaluation or interpretation.

The radio 1104 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 1100 can include, or be coupled with, multiple transmit antennas (each with a corresponding transmit chain) and multiple receive antennas (each with a corresponding receive chain). The symbols output from the modem 1102 are provided to the radio 1104, which then transmits the symbols via the coupled antennas. Similarly, symbols received via the antennas are obtained by the radio 1104, which then provides the symbols to the modem 1102. In some implementations, the radio 1104 and the one or more antennas may form one or more network interfaces (which also may be referred to as "interfaces").

The processor 1106 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1106 processes information received through the radio 1104 and the modem 1102, and processes information to be output through the modem 1102 and the radio 1104 for transmission through the wireless medium. For example, the processor 1106 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1106 may generally control the modem 1102 to cause the modem to perform various operations described above.

The memory 1108 can include tangible storage media such as random-access memory (RAM) or read-only memory (ROM), or combinations thereof. The memory 1108 also can store non-transitory processor- or computer-executable software (SW) code containing instructions that, when executed by the processor 1106, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 12:
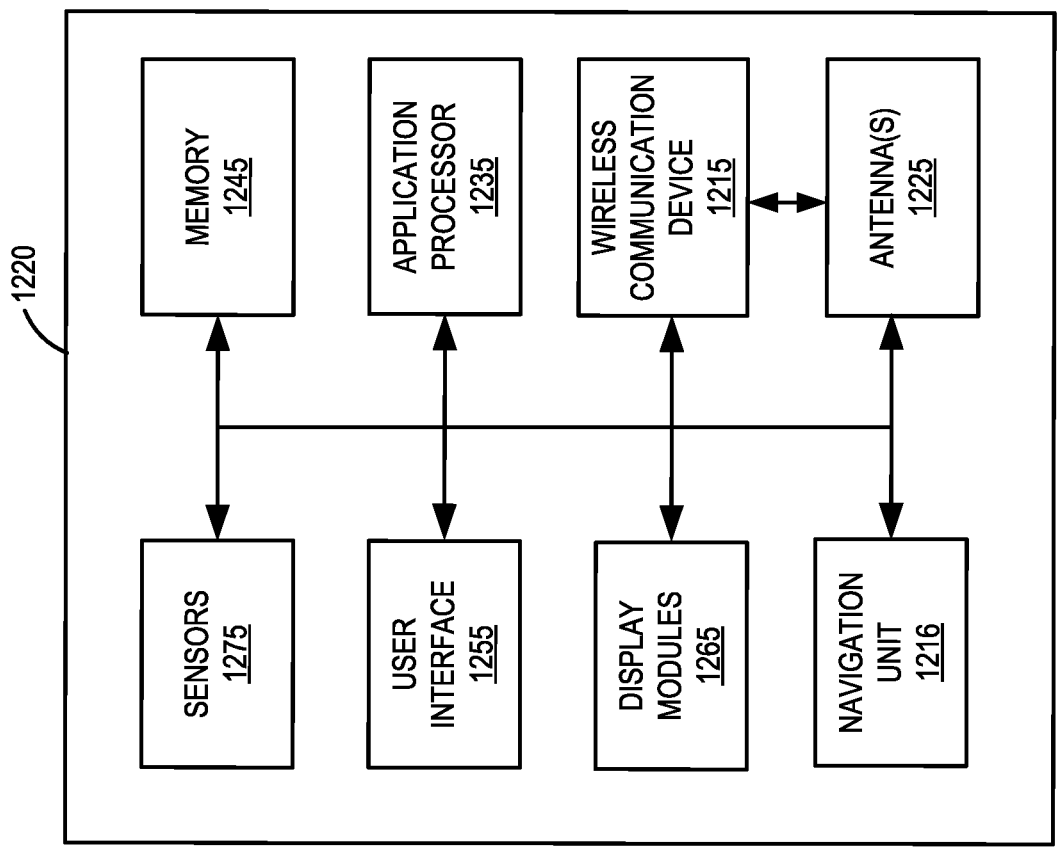
FIG. 12 shows a block diagram of an example wearable device.

FIG. 12 shows a block diagram of an example wearable device 1220. For example, the wearable device 1220 can be an example implementation of the wearable device 220 described herein. The wearable device 1220 includes a wireless communication device 1215. For example, the wireless communication device 1215 may be an example implementation of the wireless communication device 1200 described with reference to FIG. 11. The wearable device 1220 may be generally referred to as an apparatus, wearable apparatus, or a mobile apparatus. In some implementations, the wearable device 1220 also may include a navigation unit 1216 coupled with the wireless communication device 1215. In some implementations, the navigation unit 1216 may integrated in the wireless communication device 1215. The navigation unit 1216 may transmit and receive navigation signals from one or more satellites that are part of one or more satellite-based communication systems. The wearable device 1220 also includes one or more antennas 1225 coupled with the wireless communication device 1215 to transmit and receive wireless communications (such as navigation signals). The wearable device 1220 additionally includes an application processor 1235 coupled with the wireless communication device 1215, and a memory 1245 coupled with the application processor 1235. In some implementations, the wearable device 1220 further includes a user interface (UI) 1255 (such as a touchscreen or keypad) and one or more display modules 1265, which may be integrated with the UI 1255 to form a touchscreen display. The one or more display modules also may include projectors and LED lights that are used to display directional visual indicators external to the wearable device 1220 as described herein. In some implementations, the wearable device 1220 may further include one or more sensors 1275 such as, for example, one or more inertial sensors, accelerometers, temperature sensors, pressure sensors, or altitude sensors. Ones of the aforementioned components can communicate with other ones of the components directly or indirectly, over at least one bus. The wearable device 1220 further includes a housing that encompasses the wireless communication device 1215, the application processor 1235, the memory 1245, and at least portions of the antennas 1225, UI 1255, and display modules 1265.

FIGS. 1-12 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One aspect of the subject matter described in this disclosure can be implemented in a method for displaying directional visual indicators for navigation performed by a wearable device. The method may include receiving navigation signals while the wearable device may be in a navigation mode. The navigation signals may indicate a direction of travel. The method may include displaying a first directional visual indicator corresponding to the direction of travel. The first directional visual indicator may be displayed external to the wearable device.

Clause 2. The method of clause 1, where the first directional visual indicator displayed external to the wearable device may be a directional light or a directional projection displayed external to the wearable device in the direction of travel.

Clause 3. The method of any one or more of clauses 1-2, where the directional projection may be a projection of a map associated with the navigation in the direction of travel, a projection of an arrow pointing in the direction of travel, or a projection of a text message indicating the direction of travel.

Clause 4. The method of any one or more of clauses 1-3, where the directional light may be a static light, a moving light in the direction of travel, a sliding light, a flashing light, or a glowing light.

Clause 5. The method of any one or more of clauses 1-4, where the method may further include, if the direction of travel may be changing from a first direction to a second direction, displaying a second directional visual indicator external to the wearable device and turning off the first directional visual indicator.

Clause 6. The method of any one or more of clauses 1-5, where the method may further include displaying the second directional visual indicator with a higher light intensity level than the first directional visual indicator. The higher light intensity level of the displayed second directional visual indicator may indicate the direction of travel may be changing from the first direction to the second direction.

Clause 7. The method of any one or more of clauses 1-6, where the method may further include blinking the displayed second directional visual indicator. The blinking of the displayed second directional visual indicator may indicate the direction of travel may be changing from the first direction to the second direction.

Clause 8. The method of any one or more of clauses 1-7, where the method may further include, if the direction of travel may be changing from a first direction to a second direction, displaying a second directional visual indicator external to the wearable device from a first side section of the wearable device in the second direction and turning off the first directional visual indicator, and if the direction of travel may be changing from the first direction to a third direction, displaying a third directional visual indicator external to the wearable device from a second side section of the wearable device in the third direction and turning off the first directional visual indicator.

Clause 9. The method of any one or more of clauses 1-8, where the first directional visual indicator may be displayed external to the wearable device from a top section of the wearable device in the first direction. The method may further include, if the direction of travel may be remaining the same, continuing to display the first directional visual indicator external to the wearable device from the top section of the wearable device in the first direction, and if the direction of travel may be changing from the first direction to a fourth direction that may be an opposite direction compared to the first direction, displaying a fourth directional visual indicator external to the wearable device from a bottom section of the wearable device in the fourth direction.

Clause 10. The method of any one or more of clauses 1-9, where, if the wearable device is a smart watch, the method of displaying the second directional visual indicator external to the wearable device from the first side section of the wearable device in the second direction may include displaying the second directional visual indicator from the first side section of the wearable device to a user's hand, and the method of displaying the third directional visual indicator external to the wearable device from the second side section of the wearable device in the third direction may include displaying the third directional visual indicator from the second side section of the wearable device to a user's arm.

Clause 11. The method of any one or more of clauses 1-10, where the method may further include detecting, by one or more sensors of the wearable device, an emergency condition, and displaying two or more directional visual indicators external to the wearable device from two or more sections of the wearable device in two or more directions in response to detecting the emergency condition.

Clause 12. The method of any one or more of clauses 1-11, where the two or more directional visual indicators may be two or more directional lights, two or more directional projections, or at least one directional light and at least one directional projection.

Clause 13. The method of any one or more of clauses 1-12, where the navigation signals may be received by the wearable device from a satellite.

Clause 14. Another aspect of the subject matter described in this disclosure can be implemented in a wearable device configured to display directional visual indicators for navigation. The wearable device may include one or more interfaces and one or more display modules. The one or more interfaces may be configured to receive navigation signals while the wearable device may be in a navigation mode. The navigation signals may indicate a direction of travel. The one or more display modules may be configured to display a first directional visual indicator corresponding to the direction of travel. The first directional visual indicator may be displayed external to the wearable device.

Clause 15. The wearable device of clause 14, where the first directional visual indicator displayed external to the wearable device may be a directional light or a directional projection displayed external to the wearable device in the direction of travel.

Clause 16. The wearable device of any one or more of clauses 14-15, where the directional projection may be a projection of a map associated with the navigation in the direction of travel, a projection of an arrow pointing in the direction of travel, or a projection of a text message indicating the direction of travel.

Clause 17. The wearable device of any one or more of clauses 14-16, where the directional light may be a static light, a moving light in the direction of travel, a sliding light, a flashing light, or a glowing light.

Clause 18. The wearable device of any one or more of clauses 14-17, where, if the direction of travel may be changing from a first direction to a second direction, the one or more display modules may be configured to display a second directional visual indicator external to the wearable device, and turn off the first directional visual indicator.

Clause 19. The wearable device of any one or more of clauses 14-18, where the one or more display modules may be configured to display the second directional visual indicator with a higher light intensity level than the first directional visual indicator. The higher light intensity level of the displayed second directional visual indicator may indicate the direction of travel may be changing from the first direction to the second direction.

Clause 20. The wearable device of any one or more of clauses 14-19, where the one or more display modules may be configured to blink the displayed second directional visual indicator to indicate the direction of travel may be changing from the first direction to the second direction.

Clause 21. The wearable device of any one or more of clauses 14-20, where, if the direction of travel may be changing from a first direction to a second direction, the one or more display modules may be configured to display a second directional visual indicator external to the wearable device from a first side section of the wearable device in the second direction and turn off the first directional visual indicator, and if the direction of travel may be changing from the first direction to a third direction, the one or more display modules may be configured to display a third directional visual indicator external to the wearable device from a second side section of the wearable device in the third direction and turn off the first directional visual indicator.

Clause 22. The wearable device of any one or more of clauses 14-21, where the one or more display modules may be configured to display the first directional visual indicator external to the wearable device from a top section of the wearable device in the first direction. If the direction of travel may be remaining the same, the one or more display modules may be configured to continue to display the first directional visual indicator external to the wearable device from the top section of the wearable device in the first direction, and if the direction of travel may be changing from the first direction to a fourth direction that may be an opposite direction compared to the first direction, the one or more display modules may be configured to display a fourth directional visual indicator external to the wearable device from a bottom section of the wearable device in the fourth direction.

Clause 23. The wearable device of any one or more of clauses 14-22, where, if the wearable device is a smart watch, the one or more display modules may be configured to display the second directional visual indicator from the first side section of the wearable device to a user's hand, and the one or more display modules may be configured to display the third directional visual indicator from the second side section of the wearable device to a user's arm.

Clause 24. The wearable device of any one or more of clauses 14-23, further including one or more sensors configured to detect an emergency condition. The one or more display modules may be configured to display two or more directional visual indicators external to the wearable device from two or more sections of the wearable device in two or more directions in response to a detection of the emergency condition.

Clause 25. The wearable device of any one or more of clauses 14-24, where the two or more directional visual indicators may be two or more directional lights, two or more directional projections, or at least one directional light and at least one directional projection.

Clause 26. Another aspect of the subject matter described in this disclosure can be implemented in an apparatus configured to display directional visual indicators for navigation. The apparatus may include means for receiving navigation signals while the apparatus may be in a navigation mode. The navigation signals may indicate a direction of travel. The apparatus may include means for displaying a first directional visual indicator corresponding to the direction of travel. The first directional visual indicator may be displayed external to the apparatus.

Clause 27. The apparatus of clause 26, where the first directional visual indicator may be a directional light or a directional projection displayed external to the apparatus in the direction of travel.

Clause 28. The apparatus of any one or more of clauses 26-27, where the directional projection may be a projection of a map associated with the navigation in the direction of travel, a projection of an arrow pointing in the direction of travel, or a projection of a text message indicating the direction of travel.

Clause 29. The apparatus of any one or more of clauses 26-28, where the directional light may be a static light, a moving light in the direction of travel, a sliding light, a flashing light, or a glowing light.

Clause 30. The apparatus of any one or more of clauses 26-29, further including means for displaying a second directional visual indicator external to the apparatus if the direction of travel may be changing from a first direction to a second direction.

Clause 31. The apparatus of any one or more of clauses 26-30, further including means for displaying the second directional visual indicator with a higher light intensity level than the first directional visual indicator. The higher light intensity level of the displayed second directional visual indicator may indicate the direction of travel may be changing from the first direction to the second direction.

Clause 32. The apparatus of any one or more of clauses 26-31, further including means for displaying a second directional visual indicator external to the apparatus from a first side section of the apparatus in a second direction if the direction of travel may be changing from a first direction to the second direction, and means for displaying a third directional visual indicator external to the apparatus from a second side section of the apparatus in a third direction if the direction of travel may be changing from the first direction to the third direction.

Clause 33. The apparatus of any one or more of clauses 26-32, further including means for displaying the first directional visual indicator from a top section of the apparatus in the first direction if the direction of travel may be remaining in the first direction, and means for displaying a fourth directional visual indicator external to the apparatus from a bottom section of the apparatus in a fourth direction if the direction of travel may be changing from the first direction to the fourth direction.

Clause 34. The apparatus of any one or more of clauses 26-33, further including means for detecting an emergency condition, and means for displaying two or more directional visual indicators external to the apparatus from two or more sections of the apparatus in two or more directions in response to detecting the emergency condition.

Clause 35. The apparatus of any one or more of clauses 26-34, where the two or more directional visual indicators may be two or more directional lights, two or more directional projections, or at least one directional light and at least one directional projection.

Clause 36. Another aspect of the subject matter described in this disclosure can be implemented in a non-transitory computer-readable medium having stored therein instructions which, when executed by a processor of a wearable device, may cause the wearable device to receive navigation signals while the wearable device may be in a navigation mode. The navigation signals may indicate a direction of travel. The instructions, when executed by the processor of the wearable device, may cause the wearable device to display a first directional visual indicator corresponding to the direction of travel. The first directional visual indicator may be displayed external to the wearable device.

Clause 37. The non-transitory computer-readable medium of clause 36, where the first directional visual indicator displayed external to the wearable device may be a directional light or a directional projection displayed external to the wearable device in the direction of travel.

Clause 38. The non-transitory computer-readable medium of clauses 36-37, where the directional projection may be a projection of a map associated with a navigation in the direction of travel, a projection of an arrow pointing in the direction of travel, or a projection of a text message indicating the direction of travel.

Clause 39. The non-transitory computer-readable medium of clauses 36-38, where the directional light may be a static light, a moving light in the direction of travel, a sliding light, a flashing light, or a glowing light.

Clause 40. The non-transitory computer-readable medium of clauses 36-39, where the instructions, when executed by the processor of the wearable device, may cause the wearable device to display a second directional visual indicator external to the wearable device and turn off the first directional visual indicator if the direction of travel may be changing from a first direction to a second direction.

Clause 41. The non-transitory computer-readable medium of clauses 36-40, where the instructions, when executed by the processor of the wearable device, may cause the wearable device to display the second directional visual indicator with a higher light intensity level than the first directional visual indicator. The higher light intensity level of the displayed second directional visual indicator may indicate the direction of travel may be changing from the first direction to the second direction.

Clause 42. The non-transitory computer-readable medium of clauses 36-41, where the instructions, when executed by the processor of the wearable device, may cause the wearable device to blink the displayed second directional visual indicator to indicate the direction of travel may be changing from the first direction to the second direction.

Clause 43. The non-transitory computer-readable medium of clauses 36-42, where the instructions, when executed by the processor of the wearable device, may cause the wearable device to, if the direction of travel may be changing from a first direction to a second direction, display a second directional visual indicator external to the wearable device from a first side section of the wearable device in the second direction and turn off the first directional visual indicator, and if the direction of travel may be changing from the first direction to a third direction, display a third directional visual indicator external to the wearable device from a second side section of the wearable device in the third direction and turn off the first directional visual indicator.

Clause 44. The non-transitory computer-readable medium of clauses 36-43, where the instructions, when executed by the processor of the wearable device, may cause the wearable device to display the first directional visual indicator external to the wearable device from a top section of the wearable device in the first direction. The instructions, when executed by the processor of the wearable device, may cause the wearable device to, if the direction of travel may be remaining the same, continue to display the first directional visual indicator external to the wearable device from the top section of the wearable device in the first direction, and if the direction of travel may be changing from the first direction to a fourth direction that may be an opposite direction compared to the first direction, display a fourth directional visual indicator external to the wearable device from a bottom section of the wearable device in the fourth direction.

Clause 45. The non-transitory computer-readable medium of clauses 36-44, where the instructions, when executed by the processor of the wearable device, may cause the wearable device to detect an emergency condition, and display two or more directional visual indicators external to the wearable device from two or more sections of the wearable device in two or more directions in response to a detection of the emergency condition.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, units, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, units, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray' disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable device configured to display visual indicators, comprising:
a processing system that includes one or more processors and one or more memories coupled with the one or more processors, the processing system configured to cause the wearable device to:
receive one or more signals; and
display a first directional visual indicator in accordance with the one or more signals, wherein the first directional visual indicator is a directional projection displayed external to the wearable device, wherein the directional projection indicates a direction of travel, and wherein the directional projection is a projection of a map associated with the direction of travel or a projection of an arrow pointing in the direction of travel.

2. The wearable device of claim 1, wherein the processing system is further configured to cause the wearable device to:
display a second directional visual indicator, wherein the second directional visual indicator is a directional light displayed external to the wearable device or a second directional projection displayed external to the wearable device.

3. The wearable device of claim 2, wherein the directional light is a static light, a moving light in a direction associated with a mode of the wearable device, a sliding light, a flashing light, or a glowing light.

4. The wearable device of claim 1, wherein the direction of travel is associated with a mode of the wearable device.

5. The wearable device of claim 1, wherein, if the direction of travel associated with a mode of the wearable device is changing from a first direction to a second direction, the processing system is further configured to cause the wearable device to:
display a second directional visual indicator external to the wearable device; and
turn off the first directional visual indicator.

6. The wearable device of claim 5, wherein the processing system is further configured to cause the wearable device to:
display the second directional visual indicator with a higher light intensity level than the first directional visual indicator, the higher light intensity level of the second directional visual indicator indicating the direction of travel is changing from the first direction to the second direction.

7. The wearable device of claim 5, wherein the processing system is further configured to cause the wearable device to:
blink the second directional visual indicator, the blinking of the second directional visual indicator indicating the direction of travel is changing from the first direction to the second direction.

8. The wearable device of claim 1, wherein:
if the direction of travel associated with a mode of the wearable device is changing from a first direction to a second direction, the processing system is further configured to cause the wearable device to display a second directional visual indicator external to the wearable device from a first side section of the wearable device in the second direction and turn off the first directional visual indicator; and
if the direction of travel associated with the mode of the wearable device is changing from the first direction to a third direction, the processing system is further configured to cause the wearable device to display a third directional visual indicator external to the wearable device from a second side section of the wearable device in the third direction and turn off the first directional visual indicator.

9. The wearable device of claim 8, wherein the first directional visual indicator is displayed external to the wearable device from a top section of the wearable device in the first direction, and wherein:
if the direction of travel associated with the mode of the wearable device remains a same direction, the processing system is further configured to cause the wearable device to continue to display the first directional visual indicator external to the wearable device from the top section of the wearable device in the first direction; and
if the direction of travel associated with the mode of the wearable device is changing from the first direction to a fourth direction that is an opposite direction compared to the first direction, the processing system is further configured to cause the wearable device to display a fourth directional visual indicator external to the wearable device from a bottom section of the wearable device in the fourth direction.

10. The wearable device of claim 8, wherein, if the wearable device is a smart watch,
to display the second directional visual indicator external to the wearable device from the first side section of the wearable device in the second direction, the processing system is further configured to cause the wearable device to display the second directional visual indicator from the first side section of the wearable device to a user's hand; and
to display the third directional visual indicator external to the wearable device from the second side section of the wearable device in the third direction, the processing system is further configured to cause the wearable device to display the third directional visual indicator from the second side section of the wearable device to a user's arm.

11. The wearable device of claim 1, wherein the processing system is further configured to cause the wearable device to:
detect, by one or more sensors of the wearable device, an emergency condition; and
display two or more directional visual indicators external to the wearable device from two or more sections of the wearable device in two or more directions in response to detecting the emergency condition.

12. The wearable device of claim 11, wherein the emergency condition corresponds to a heart rate of a user based at least in part on a heart rate monitor of the wearable device.

13. The wearable device of claim 11, wherein the emergency condition corresponds to a fall by a user of the wearable device.

14. The wearable device of claim 1, wherein the wearable device is a fitness tracker, and wherein the first directional visual indicator corresponds to a fitness task.

15. A method for displaying visual indicators performed by a wearable device, comprising:
receiving one or more signals; and
displaying a first directional visual indicator in accordance with the one or more signals, wherein the first directional visual indicator is a directional projection displayed external to the wearable device, wherein the directional projection indicates a direction of travel, and wherein the directional projection is a projection of a map associated with the direction of travel or a projection of an arrow pointing in the direction of travel.

16. The method of claim 15, further comprising:
displaying a second directional visual indicator, wherein the second directional visual indicator is a directional light displayed external to the wearable device or a second directional projection displayed external to the wearable device.

17. The method of claim 15, wherein, if the direction of travel associated with a mode of the wearable device is changing from a first direction to a second direction, the method further comprises:
displaying a second directional visual indicator external to the wearable device; and
turning off the first directional visual indicator.

18. The method of claim 17, further comprising:
displaying the second directional visual indicator with a higher light intensity level than the first directional visual indicator, the higher light intensity level of the second directional visual indicator indicating the direction of travel is changing from the first direction to the second direction.

19. The method of claim 17, further comprising:
blinking the second directional visual indicator to indicate the direction of travel is changing from the first direction to the second direction.

20. The method of claim 15, wherein:
if the direction of travel associated with a mode of the wearable device is changing from a first direction to a second direction, the method further comprises displaying a second directional visual indicator external to the wearable device from a first side section of the wearable device in the second direction and turning off the first directional visual indicator; and
if the direction of travel associated with the mode of the wearable device is changing from the first direction to a third direction, the method further comprises displaying a third directional visual indicator external to the wearable device from a second side section of the wearable device in the third direction and turning off the first directional visual indicator.

21. A fitness tracker configured to display visual indicators, comprising:
a processing system that includes one or more processors and one or more memories coupled with the one or more processors, the processing system configured to cause the fitness tracker to:
receive one or more signals; and
display a first visual indicator in accordance with the one or more signals, wherein the first visual indicator is a directional projection corresponding to a fitness task and displayed external to the fitness tracker, and wherein the directional projection is a projection of a direction of travel associated with the fitness task, a projection of an arrow pointing in the direction of travel associated with the fitness task, or a projection of a text message indicating the direction of travel associated with the fitness task.

22. The fitness tracker of claim 21, wherein the processing system is further configured to cause the fitness tracker to:
detect, by one or more sensors of the fitness tracker, an emergency condition; and
display two or more visual indicators external to the fitness tracker from two or more sections of the fitness tracker in two or more directions in response to detecting the emergency condition.

23. The fitness tracker of claim 22, wherein the emergency condition corresponds to a heart rate of a user based at least in part on a heart rate monitor of the fitness tracker.

24. The fitness tracker of claim 22, wherein the emergency condition corresponds to a fall by a user of the fitness tracker.

* * * * *